US012487924B2

(12) United States Patent
Österlund et al.

(10) Patent No.: US 12,487,924 B2
(45) Date of Patent: Dec. 2, 2025

(54) CONCURRENT LAZY REFERENCE COUNTING IN AN OLD GARBAGE COLLECTION GENERATION

(71) Applicant: Oracle International Corporation, Redwood Shores, CA (US)

(72) Inventors: Erik Österlund, Vasterhaninge (SE); Stefan Mats Rikard Karlsson, Nacka (SE)

(73) Assignee: Oracle International Corporation, Redwood Shores, CA (US)

( * ) Notice: Subject to any disclaimer, the term of this patent is extended or adjusted under 35 U.S.C. 154(b) by 24 days.

(21) Appl. No.: 18/401,982

(22) Filed: Jan. 2, 2024

(65) Prior Publication Data

US 2025/0217285 A1 Jul. 3, 2025

(51) Int. Cl.
*G06F 12/02* (2006.01)
*G06F 9/455* (2018.01)

(52) U.S. Cl.
CPC ...... *G06F 12/0276* (2013.01); *G06F 9/45558* (2013.01); *G06F 2009/45583* (2013.01)

(58) Field of Classification Search
CPC ............ G06F 12/0276; G06F 9/45558; G06F 2009/45583
See application file for complete search history.

(56) References Cited

U.S. PATENT DOCUMENTS

| 5,765,007 A | 6/1998 | Rahman et al. |
| 5,787,430 A | 7/1998 | Doeringer et al. |
| 5,842,016 A | 11/1998 | Toutonghi et al. |
| 5,873,104 A | 2/1999 | Tremblay et al. |
| 5,928,357 A | 7/1999 | Underwood et al. |

(Continued)

FOREIGN PATENT DOCUMENTS

| CA | 2700217 C | 7/2011 |
| CN | 117539478 A | 2/2024 |

(Continued)

OTHER PUBLICATIONS

Pekka, "Barrier techniques for incremental tracing" chrome-extension://efaidnbmnnnibpcajpcglclefindmkaj/https://dl.acm.org/doi/pdf/10.1145/301589.286863, 1998, (Year: 1998).*

(Continued)

*Primary Examiner* — Maher N Algibhah
(74) *Attorney, Agent, or Firm* — Invoke

(57) ABSTRACT

Techniques for concurrent lazy reference tracking in an old garbage collection generation are disclosed, including: encountering, by a mutator thread during a garbage collection epoch, a first instruction to write a first value to a field; responsive to encountering the first instruction to write the first value to the field: entering a slow-path write barrier; performing, by the slow-path write barrier, a first one or more reference counting operations with respect to the field; encountering, by the mutator thread during the first garbage collection epoch and subsequent to encountering the first instruction to write the first value to the field, a second instruction to write a second value to the field; responsive to encountering the second instruction to write the second value to the field: entering a fast-path write barrier; wherein the fast-path write barrier does not perform any reference counting operations with respect to the field.

20 Claims, 11 Drawing Sheets

(56) References Cited

U.S. PATENT DOCUMENTS

| | | |
|---|---|---|
| 5,933,840 A | 8/1999 | Menon et al. |
| 6,052,699 A | 4/2000 | Huelsbergen et al. |
| 6,065,020 A | 5/2000 | Dussud |
| 6,158,024 A | 12/2000 | Mandal |
| 6,226,653 B1 | 5/2001 | Alpern et al. |
| 6,304,949 B1 | 10/2001 | Houlsdworth |
| 6,324,637 B1 | 11/2001 | Hamilton |
| 6,499,032 B1 | 12/2002 | Tikkanen et al. |
| 6,567,905 B2 | 5/2003 | Otis |
| 6,694,346 B1 | 2/2004 | Aman et al. |
| 6,728,732 B1 | 4/2004 | Eatherton et al. |
| 6,766,513 B2 | 7/2004 | Charnell et al. |
| 6,769,004 B2 | 7/2004 | Barrett |
| 6,809,792 B1 | 10/2004 | Tehranchi et al. |
| 6,915,296 B2 | 7/2005 | Parson |
| 7,072,905 B2 | 7/2006 | Garthwaite |
| 7,089,272 B1 | 8/2006 | Garthwaite et al. |
| 7,269,705 B1 | 9/2007 | Seidl et al. |
| 7,293,051 B1 | 11/2007 | Printezis et al. |
| 7,389,395 B1 | 6/2008 | Garthwaite et al. |
| 7,404,182 B1 | 7/2008 | Garthwaite et al. |
| 7,428,560 B1* | 9/2008 | Detlefs ............... G06F 12/0276 |
| 7,523,081 B1 | 4/2009 | Engebretsen |
| 7,539,837 B1 | 5/2009 | Flood et al. |
| 7,546,587 B2 | 6/2009 | Marr et al. |
| 7,548,940 B2 | 6/2009 | Bacon et al. |
| 7,610,437 B2 | 10/2009 | Sinclair et al. |
| 7,774,389 B2 | 8/2010 | Stephens et al. |
| 7,808,929 B2 | 10/2010 | Wong et al. |
| 7,904,493 B2 | 3/2011 | Schmelter et al. |
| 7,962,707 B2 | 6/2011 | Kaakani et al. |
| 7,984,084 B2 | 7/2011 | Sinclair |
| 8,051,426 B2 | 11/2011 | Meijer et al. |
| 8,261,269 B2 | 9/2012 | Garmark |
| 8,285,918 B2 | 10/2012 | Maheshwari |
| 8,381,094 B1 | 2/2013 | Prasad et al. |
| 8,429,526 B2 | 4/2013 | Sthanikam et al. |
| 8,443,263 B2 | 5/2013 | Selinger et al. |
| 8,495,093 B2 | 7/2013 | Baudel |
| 8,499,283 B2 | 7/2013 | Mony |
| 8,539,338 B2 | 9/2013 | Zhu et al. |
| 8,655,913 B1 | 2/2014 | Shah et al. |
| 8,688,754 B1 | 4/2014 | Burka et al. |
| 8,788,778 B1 | 7/2014 | Boyle |
| 8,825,719 B2 | 9/2014 | Steensgaard et al. |
| 8,825,721 B2 | 9/2014 | Hunt et al. |
| 8,856,186 B1 | 10/2014 | Li et al. |
| 8,873,284 B2 | 10/2014 | Sinclair et al. |
| 9,135,169 B2 | 9/2015 | Kawachiya et al. |
| 9,171,097 B2 | 10/2015 | Ceze et al. |
| 9,208,081 B1 | 12/2015 | Dice et al. |
| 9,223,693 B2 | 12/2015 | Sinclair et al. |
| 9,268,763 B1 | 2/2016 | Esho et al. |
| 9,305,169 B2 | 4/2016 | Borohovski et al. |
| 9,323,608 B2 | 4/2016 | Troia |
| 9,330,191 B2 | 5/2016 | Teevan et al. |
| 9,330,395 B2 | 5/2016 | Hauser |
| 9,336,133 B2 | 5/2016 | Sinclair et al. |
| 9,338,143 B2 | 5/2016 | Hansen et al. |
| 9,348,746 B2 | 5/2016 | Sinclair et al. |
| 9,386,037 B1 | 7/2016 | Hunt et al. |
| 9,465,731 B2 | 10/2016 | Sinclair et al. |
| 9,503,435 B2 | 11/2016 | Mizrahi et al. |
| 9,578,048 B1 | 2/2017 | Hunt et al. |
| 9,652,382 B1 | 5/2017 | Subramanian et al. |
| 9,727,456 B2 | 8/2017 | Malwankar et al. |
| 9,734,050 B2 | 8/2017 | Sinclair et al. |
| 9,734,911 B2 | 8/2017 | Sinclair et al. |
| 9,740,716 B2 | 8/2017 | Wilhelmsson |
| 9,778,855 B2 | 10/2017 | Sinclair |
| 9,953,014 B1 | 4/2018 | Reshadi et al. |
| 9,971,683 B1 | 5/2018 | Bell et al. |
| 10,002,074 B2 | 6/2018 | Flood et al. |
| 10,084,779 B2 | 9/2018 | Hunt et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,127,210 B1 | 11/2018 | Karppanen |
| 10,133,490 B2 | 11/2018 | Sinclair et al. |
| 10,146,749 B2 | 12/2018 | Ayoub et al. |
| 10,146,752 B2 | 12/2018 | Ciabarra et al. |
| 10,255,179 B2 | 4/2019 | Ji et al. |
| 10,261,898 B1 | 4/2019 | Payer |
| 10,318,592 B2 | 6/2019 | Ciabarra et al. |
| 10,346,520 B2 | 7/2019 | Hunt et al. |
| 10,419,568 B2 | 9/2019 | Rubtsov et al. |
| 10,430,279 B1 | 10/2019 | Dittia et al. |
| 10,452,758 B1 | 10/2019 | Bhowmick |
| 10,547,679 B1 | 1/2020 | Burnett et al. |
| 10,664,391 B2 | 5/2020 | Jang |
| 10,726,091 B2 | 7/2020 | Isager |
| 10,739,996 B1 | 8/2020 | Ebsen et al. |
| 10,757,101 B2 | 8/2020 | Hunt et al. |
| 10,795,812 B1 | 10/2020 | Duggal et al. |
| 10,908,930 B2 | 2/2021 | Yeh |
| 10,929,288 B2 | 2/2021 | Moore et al. |
| 10,969,959 B2 | 4/2021 | Somasundaram et al. |
| 10,983,715 B2 | 4/2021 | Sharoni et al. |
| 10,983,908 B1 | 4/2021 | Zou et al. |
| 10,986,182 B1 | 4/2021 | Burnett et al. |
| 10,996,884 B2 | 5/2021 | Danilov et al. |
| 11,050,811 B2 | 6/2021 | Mashaal et al. |
| 11,086,537 B2 | 8/2021 | Byun |
| 11,157,680 B1 | 10/2021 | Lee et al. |
| 11,165,822 B2 | 11/2021 | Hunt et al. |
| 11,194,885 B1 | 12/2021 | Parhami et al. |
| 11,201,892 B1 | 12/2021 | Kashitsyn et al. |
| 11,222,091 B2 | 1/2022 | Liu et al. |
| 11,228,611 B1 | 1/2022 | John et al. |
| 11,301,539 B2 | 4/2022 | Macxis et al. |
| 11,366,801 B1 | 6/2022 | Kumar et al. |
| 11,397,843 B1 | 7/2022 | Lee et al. |
| 11,507,503 B1 | 11/2022 | Sterlund et al. |
| 11,561,962 B2 | 1/2023 | Abdoun et al. |
| 11,573,894 B2 | 2/2023 | Österlund et al. |
| 11,601,460 B1 | 3/2023 | Hunt |
| 2002/0059520 A1 | 5/2002 | Murakami et al. |
| 2003/0005027 A1 | 1/2003 | Borman et al. |
| 2003/0188141 A1 | 10/2003 | Chaudhry et al. |
| 2004/0024812 A1 | 2/2004 | Park et al. |
| 2004/0186863 A1 | 9/2004 | Garthwaite |
| 2004/0187102 A1 | 9/2004 | Garthwaite |
| 2005/0066329 A1 | 3/2005 | Fischer et al. |
| 2005/0081190 A1 | 4/2005 | Betancourt et al. |
| 2005/0102670 A1 | 5/2005 | Bretl et al. |
| 2005/0114844 A1 | 5/2005 | Betancourt et al. |
| 2005/0149686 A1 | 7/2005 | Bacon et al. |
| 2005/0160413 A1 | 7/2005 | Broussard et al. |
| 2005/0160416 A1 | 7/2005 | Jamison |
| 2005/0188164 A1 | 8/2005 | Ballantyne et al. |
| 2005/0235006 A1 | 10/2005 | Adl-Tabatabai et al. |
| 2005/0267996 A1 | 12/2005 | O'Connor et al. |
| 2006/0005171 A1 | 1/2006 | Ellison |
| 2006/0026379 A1 | 2/2006 | Jung |
| 2006/0143168 A1 | 6/2006 | Rossmann |
| 2006/0143395 A1 | 6/2006 | Zohar et al. |
| 2007/0016633 A1 | 1/2007 | Lindholm et al. |
| 2007/0022149 A1 | 1/2007 | Bacon et al. |
| 2007/0033325 A1 | 2/2007 | Sinclair |
| 2007/0162528 A1 | 7/2007 | Wright et al. |
| 2007/0203960 A1 | 8/2007 | Guo |
| 2007/0234005 A1 | 10/2007 | Erlingsson et al. |
| 2007/0240035 A1 | 10/2007 | Sthanikam et al. |
| 2008/0034175 A1 | 2/2008 | Traister et al. |
| 2008/0082596 A1 | 4/2008 | Gorobets |
| 2008/0086619 A1 | 4/2008 | Traister et al. |
| 2008/0140737 A1 | 6/2008 | Garst et al. |
| 2008/0162787 A1 | 7/2008 | Tomlin et al. |
| 2008/0189477 A1 | 8/2008 | Asano et al. |
| 2008/0250213 A1 | 10/2008 | Holt |
| 2009/0007075 A1 | 1/2009 | Edmark et al. |
| 2009/0037660 A1 | 2/2009 | Fairhurst |
| 2009/0119352 A1 | 5/2009 | Branda et al. |
| 2009/0132622 A1 | 5/2009 | Rossmann et al. |

(56) References Cited

U.S. PATENT DOCUMENTS

| | | |
|---|---|---|
| 2009/0158288 A1 | 6/2009 | Fulton et al. |
| 2009/0307256 A1 | 12/2009 | Tiyyagura |
| 2009/0307292 A1 | 12/2009 | Li et al. |
| 2009/0319720 A1 | 12/2009 | Stefanus et al. |
| 2009/0328007 A1 | 12/2009 | Chen et al. |
| 2010/0011357 A1 | 1/2010 | Ramamurthy |
| 2010/0070727 A1 | 3/2010 | Harris et al. |
| 2010/0082710 A1 | 4/2010 | Kilner et al. |
| 2010/0114998 A1 | 5/2010 | Steensgaard et al. |
| 2010/0254254 A1 | 10/2010 | Chan et al. |
| 2010/0287028 A1 | 11/2010 | Hauser |
| 2010/0287350 A1 | 11/2010 | Ylonen |
| 2010/0318892 A1 | 12/2010 | Teevan et al. |
| 2011/0145473 A1 | 6/2011 | Maheshwari |
| 2011/0145637 A1 | 6/2011 | Gray et al. |
| 2011/0161784 A1 | 6/2011 | Selinger et al. |
| 2011/0197177 A1 | 8/2011 | Mony |
| 2011/0208792 A1 | 8/2011 | Printezis et al. |
| 2011/0246543 A1 | 10/2011 | Gracie et al. |
| 2011/0252075 A1* | 10/2011 | Ylonen .................. G06F 9/522 707/E17.007 |
| 2011/0252216 A1* | 10/2011 | Ylonen .................... G06F 9/52 711/170 |
| 2011/0258532 A1 | 10/2011 | Ceze et al. |
| 2011/0286420 A1 | 11/2011 | Cho et al. |
| 2012/0203804 A1 | 8/2012 | Burka et al. |
| 2012/0260157 A1 | 10/2012 | Zhu et al. |
| 2013/0054925 A1 | 2/2013 | Hsia |
| 2013/0073821 A1 | 3/2013 | Flynn et al. |
| 2013/0138703 A1 | 5/2013 | Daynes et al. |
| 2013/0227236 A1 | 8/2013 | Flynn et al. |
| 2013/0232402 A1 | 9/2013 | Lu et al. |
| 2013/0290648 A1 | 10/2013 | Shao et al. |
| 2013/0318132 A1 | 11/2013 | Basu et al. |
| 2013/0326333 A1 | 12/2013 | Hashmi |
| 2013/0332909 A1 | 12/2013 | Odaira et al. |
| 2014/0032922 A1 | 1/2014 | Spilman |
| 2014/0033213 A1 | 1/2014 | Hudson et al. |
| 2014/0101372 A1 | 4/2014 | Jung et al. |
| 2014/0108817 A1 | 4/2014 | Chen et al. |
| 2014/0173744 A1 | 6/2014 | Borohovski et al. |
| 2014/0195818 A1 | 7/2014 | Neumann et al. |
| 2014/0278447 A1 | 9/2014 | Unoki et al. |
| 2014/0282872 A1 | 9/2014 | Hansen et al. |
| 2014/0283040 A1 | 9/2014 | Wilkerson et al. |
| 2014/0310235 A1 | 10/2014 | Chan et al. |
| 2014/0325148 A1 | 10/2014 | Choi et al. |
| 2014/0359201 A1 | 12/2014 | Chakrabarti |
| 2014/0365719 A1 | 12/2014 | Kuzmin et al. |
| 2015/0006843 A1 | 1/2015 | Moser |
| 2015/0026167 A1 | 1/2015 | Neels et al. |
| 2015/0058381 A1 | 2/2015 | Wilhelmsson |
| 2015/0081996 A1 | 3/2015 | Flood |
| 2015/0100752 A1 | 4/2015 | Flood |
| 2015/0193399 A1 | 7/2015 | Woker et al. |
| 2015/0193402 A1 | 7/2015 | Ayoub et al. |
| 2015/0227416 A1 | 8/2015 | Reinart |
| 2015/0227602 A1 | 8/2015 | Ramu et al. |
| 2015/0254219 A1 | 9/2015 | Harel |
| 2015/0365941 A1 | 12/2015 | Liu et al. |
| 2015/0378870 A1 | 12/2015 | Marron et al. |
| 2016/0012280 A1 | 1/2016 | Ito et al. |
| 2016/0042015 A1 | 2/2016 | Landau et al. |
| 2016/0092566 A1 | 3/2016 | Barouni et al. |
| 2016/0092591 A1 | 3/2016 | Barouni et al. |
| 2016/0124802 A1 | 5/2016 | Gabor et al. |
| 2016/0163381 A1 | 6/2016 | Lee |
| 2016/0170649 A1 | 6/2016 | Ramesh et al. |
| 2016/0179580 A1 | 6/2016 | Benedict |
| 2016/0188548 A1 | 6/2016 | Ciabarra et al. |
| 2016/0239413 A1 | 8/2016 | Stephens et al. |
| 2016/0246713 A1 | 8/2016 | Choi et al. |
| 2016/0283369 A1 | 9/2016 | Hada |
| 2016/0350214 A1 | 12/2016 | Payer et al. |
| 2017/0006135 A1 | 1/2017 | Siebel et al. |
| 2017/0017650 A1 | 1/2017 | Ciabarra et al. |
| 2017/0039242 A1 | 2/2017 | Milton et al. |
| 2017/0078286 A1 | 3/2017 | Hunt et al. |
| 2017/0078310 A1 | 3/2017 | Hunt et al. |
| 2017/0123655 A1 | 5/2017 | Sinclair et al. |
| 2017/0177168 A1 | 6/2017 | Abudib et al. |
| 2017/0177471 A1 | 6/2017 | Frazier et al. |
| 2017/0242790 A1 | 8/2017 | O'Krafka et al. |
| 2017/0262364 A1 | 9/2017 | Liden et al. |
| 2017/0286544 A1 | 10/2017 | Hunt et al. |
| 2017/0289293 A1 | 10/2017 | Rubtsov et al. |
| 2017/0308513 A1 | 10/2017 | Hunt et al. |
| 2017/0344473 A1 | 11/2017 | Gidra et al. |
| 2018/0074854 A1 | 3/2018 | Chan |
| 2018/0173728 A1 | 6/2018 | Munakata |
| 2018/0189175 A1 | 7/2018 | Ji et al. |
| 2018/0276120 A1 | 9/2018 | Vytiniotis et al. |
| 2018/0329907 A1 | 11/2018 | De Paris |
| 2018/0335968 A1 | 11/2018 | Pauley et al. |
| 2018/0365106 A1 | 12/2018 | Huang et al. |
| 2019/0028473 A1 | 1/2019 | Hunt et al. |
| 2019/0042406 A1 | 2/2019 | Guniguntala et al. |
| 2019/0042440 A1 | 2/2019 | Kumar et al. |
| 2019/0079906 A1 | 3/2019 | Karppanen |
| 2019/0340212 A1 | 11/2019 | Isager |
| 2020/0012600 A1 | 1/2020 | Konoth et al. |
| 2020/0012647 A1 | 1/2020 | Johnson et al. |
| 2020/0026781 A1 | 1/2020 | Khot et al. |
| 2020/0081748 A1 | 3/2020 | Johnson et al. |
| 2020/0089420 A1 | 3/2020 | Sharoni et al. |
| 2020/0099735 A1 | 3/2020 | Mashaal et al. |
| 2020/0125364 A1 | 4/2020 | Osterlund |
| 2020/0183584 A1 | 6/2020 | Somasundaram et al. |
| 2020/0192794 A1 | 6/2020 | Lee |
| 2020/0202127 A1 | 6/2020 | Chen et al. |
| 2020/0204587 A1 | 6/2020 | Hunt et al. |
| 2020/0218653 A1 | 7/2020 | Ryu |
| 2020/0250084 A1 | 8/2020 | Stephens et al. |
| 2020/0272681 A1 | 8/2020 | Macxis et al. |
| 2020/0310686 A1 | 10/2020 | Truong et al. |
| 2020/0310963 A1 | 10/2020 | Nilsen |
| 2020/0327052 A1 | 10/2020 | Nilsen |
| 2020/0379902 A1 | 12/2020 | Durham et al. |
| 2021/0124608 A1 | 4/2021 | Shveidel et al. |
| 2021/0200546 A1 | 7/2021 | Lemay et al. |
| 2021/0278990 A1 | 9/2021 | Choi |
| 2021/0342362 A1 | 11/2021 | Haravu et al. |
| 2021/0406216 A1 | 12/2021 | Komatsu et al. |
| 2022/0027340 A1 | 1/2022 | Abdoun et al. |
| 2022/0058732 A1 | 2/2022 | Reses |
| 2022/0070205 A1 | 3/2022 | Kashitsyn et al. |
| 2022/0138098 A1 | 5/2022 | Osterlund et al. |
| 2022/0159032 A1 | 5/2022 | John et al. |
| 2022/0188432 A1 | 6/2022 | Turmel et al. |
| 2022/0345315 A1 | 10/2022 | Ilan |
| 2022/0374353 A1* | 11/2022 | Österlund ........... G06F 12/0269 |
| 2023/0409558 A1 | 12/2023 | Wysocki et al. |
| 2024/0037164 A1 | 2/2024 | Wang |
| 2024/0039925 A1 | 2/2024 | Todasco et al. |
| 2024/0380783 A1 | 11/2024 | Tushkanov |

FOREIGN PATENT DOCUMENTS

| | | |
|---|---|---|
| JP | 4265610 B2 | 5/2009 |
| WO | 00/29937 A2 | 5/2000 |
| WO | 2016/073019 A1 | 5/2016 |
| WO | 2017/053754 A1 | 3/2017 |
| WO | 2017/178114 A9 | 12/2017 |

OTHER PUBLICATIONS

Zhao et al., "Low-latency, high-throughput garbage collection", PLDI 2022: Proceedings of the 43rd ACM SIGPLAN International Conference on Programming Language Design and Implementation, Jun. 2022, pp. 76-91.

GeeksforGeeks, "Thread in Operating System", Aug. 16, 2019, pp. 1-4, https://web.archive.org/web/20200926013500/https://www.geeksforgeeks.org/thread-in-operating-system/ (Year: 2019).

(56) References Cited

OTHER PUBLICATIONS

Guy Harris, "Thread (computing)", Dec. 2022, pp. 1-10, https://en.wikipedia.org/w/index.php?title=Thread_(computing)&oldid=1128791380 (Year: 2022).
Stephen J. Bigelow, "thread", Aug. 2023, pp. 1-10, https://www.techtarget.com/whatis/definition/thread (Year: 2023).
Sun Microsystems, "What Is a Thread?", 2005, pp. 1-2, https://www.iitk.ac.in/esc101/05Aug/tutorial/essential/threads/definition.html#:~:text=Definition:%20A%20thread%20is%20a,tasks%20in%20a%20single%20program. (Year: 2005).
Title: Detecting and eliminating memory leaks using cyclic memory allocation, author: JJ Nguyen et al, published on 2007.
Title: Reconsidering custom memory allocation; author:: ED Berger et al, published on 2002.
Title: Understanding memory allocation of Scheme programs author: M Serrano published on 2000.
Vechev et al. "Write Barrier Elision for Concurrent Garbage Collectors", 2004 (Year: 2004).
Verma A., "The comprehensive guide to react's virtual DOM", May 15, 2021, pp. 23.
Wilson, P.R., et al., "A "Card-making" scheme for controlling intergenerational differences in generation-based garbage collection on stock hardware," ACM SIGPLAN Notices, vol. 24, Issue 5, May 1989, pp. 87-92.
Write Barrier Elision for Concurrent Garbage Collectors by Vechev (Year: 2004).
Yang et al., "Deep Dive into ZGC: A Modern Garbage Collector in OpenJDK", ACM Transactions on Programming Language and Systems, ACM, New York, NY, 2022, vol. 44, No. 4, 34 Pages.
Yang et al., "Improving Program Locality in the GC using Hotness," PLDI '20, pp. 301-313, Jun. 15-20, 2020.
Yuasa et al., "Return Barrier", International Lisp Conference, 2002, pp. 1-12 (Year: 2002).
Yuasa et al., "Return Barrier," International Lisp Conference, 2002, 12 pages.
Yuasa, T., "Real-time garbage collection on general-purpose machines," Journal of Systems and Software, vol. 11, Issue 3, Mar. 1990, pp. 181-198.
ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.
"Basic Graph Algorithms", Indian Computing Olympiad, Retrieved from https://www.iarcs.org.in/inoi/online-study-material/topics/graphs-dfs.php, Retrieved on Dec. 8, 2022, pp. 3.
"Lazy Compaction", Retrieved from https://wiki.se.oracle.com/display/JPG/Lazy+Compaction, Retrieved on Sep. 20, 2022, 2 Pages.
"React as UI runtime", Overreacted, Feb. 2, 2019, pp. 38.
"Recitation 8—Dijkstra's Algorithm and DFS Numberings", Parallel and Sequential Data Structures and Algorithms, 15-210 (Fall 2013), Oct. 16, 2013, pp. 1-6.
"What is Schema?" Retrieved from https://github.com/json-schema-org/understanding-json-schema, Jan. 11, 2023, pp. 3.
"ZGC—Generations Revision 2," accessed at https://wiki.se.oracle.com/display/JPG/ZGC+-+Generations+Revision , Feb. 1, 2020, pp. 6.
A concurrent, generational garbage collector for a multithreaded implementation of ML by Doligez (Year: 1993).
A Hardware Accelerator for Tracing Garbage Collection by Maas (Year: 2018).
Armbrust Michael Michael@Databricks com et al, "Spark SQL Relational Data Processing in Spark," Proceedings of The 2015 ACM SIGMOD International Conference on Management of Data, SIGMOD '15, ACM Press, New York, New York, USA, May 27, 2015, pp. 1383-1394.
Benjamin Zorn, Barrier Methods for Garbage Collection, Nov. 1990, UC Boulder available at: https://spl.cde.state.co.us/artemis/ucbserials/ucb51110internet/1990/ucb51110494internet.pdf(Year: 1990).

Boehm et al.; "Efficient In-Memory Indexing with Generalized Prefix Trees", downloaded from https://pdfs.semanticscholar.org/c5ca/a359fe6b345580a4dd476d5dd41a90bf301c.pdf; Mar. 26, 2018.
Click et al.; "The Pauseless GC Algorithm", VEE 05, Jun. 11-12, 2005, Chicago, Illinois, USA. Copyright 2005 ACM 1-59593-047-7/05/0006 . . . S5.00.
Clifford et al., "Memento Mori: Dynamic Allocation-Site-Based Optimizations", ACM SIGPLAN Notices, vol. 50, No. 11, Jun. 14, 2015, pp. 105-117.
David Gnedt, "Fast Profiling in the HotSpot Java VM with Incremental Stack Tracing and Partial Safepoints," Faculty of Engineering and Natural Sciences, 2014, 57 pages.
Detlefs; "Concurrent Remembered Set Refinement in Generational Garbage Collection", Proceedings of the USENIX Java VM '02 Conference, Aug. 1-2, 2002, San Francisco, CA.
Domani et al., "Implementing an On-the-fly Garbage Collector for Java," ACM SIGPLAN Notices, vol. 36, No. 1, 2000, pp. 155-166.
Dorai et al., Control delimiters and their hierarchies, LISP and Symbolic Computation: An International Journal, vol. 3, 1990, pp. 67-99.
Ellis D., "What is Swagger? A beginner's guide", Jul. 26, 2022, pp. 6.
Feng et al.; "Trie-join: a trie-based method for efficient string similarity joins", Published online Oct. 4, 2011; The VLDB Journal Springer-Verlag 2011.
Fitzgerald; "The Case for Profile Directed Selection of Garbage Collectors", Proceedings of the 2nd International Symposium on Memory Management, ACM, New York, NY USA, 111-120, DOI=10.1145/362422.362472, http://doi.acm.org/10.1145/362422.362472.
Generational Garbage Collection, Write Barriers/Write Protection and userfaultfd(2) by Cracauer (Year: 2016).
Getting started with Z Garbage Collector(ZGC) in Java 11 [Tutorial] by Davis (Year: 2019).
Goetz, Java theory and practice Garbage collection in the HotSpot JVM, Generational and concurrent garbage collection, IBM Developer Works, Nov. 25, 2003.
Harris T, et al., "Dynamic filtering: multi-purpose architecture support for language runtime systems," ACM SIGARCH Computer Architecture News, vol. 38, Issue 1, Mar. 2010, pp. 39-52.
Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.
Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.
How to Implement Java's hashCode Correctly, May 19, 2016, Available online at <https://www.sitepoint.com/how-to-implement-javas-hashcode-correctly/>, 7 pages.
JDK 15, Available online at < https://openjdk.java.net/projects/jdk/15/ >, Last updated, Sep. 15, 2020, 2 pages.
JEP 333: ZGC: A Scalable Low-Latency Garbage Collector(Experimental) by Liden and Karlsson (Year: 2020).
Joisha; "Sticky Tries: Fast Insertions, Fast Lookups, No Deletions for Large Key Universe", ISMM '14, Jun. 12, 2014, Edinburgh UK.
Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.
Lokesh Gupta, "Java Secure Hashing—MD5, SHA256, SHA512, PBKDF2, BCrypt, Scrypt," Available online at <https://howtodoinjava.com/security/how-to-generate-secure-password-hash-md5-sha-pbkdf2-bcrypt-examples/> printed on Apr. 14, 2020, 38 pages.
M. Felleisen et al., Beyond Continuations: Technical Report No. 216, Feb. 1987, 13 pages.
Main—Main—OpenJDK Wiki, Created by Iris Clark, last modified by Per Liden, available online at <URL: https://wiki.openjdk.java.net/display/zgc/Main>, Oct. 15, 2020, 9 pages.

(56) References Cited

OTHER PUBLICATIONS

Mohamed A. El-Zawawy, "Recognition of Logically Related Regions Based Heap Abstraction", Journal of the Egyptian Mathematical Society, vol. 20, Issue 2, Jul. 2012, pp. 64-71, arXiv:1212.5094 [cs.LO].

Mostly Concurrent Garbage Collection Revisited by Barabash (Year: 2003).

Olsson et al.; "Trash a dynamic LC-trie and hash data structure", Trita-CSC-TCS 2006:2, ISRN/KTH/CSC/TCS-2006/2-SE, ISSN 1653-7092, Aug. 18, 2006.

Open JDK, "HotSpot Glossary of Terms", 2006, Sun Microsystems, available at <https://openjdk.java.net/groups/hotspot/docs/HotSpotGlossary.html>, 6 pages.

Osterlund E., "Garbage Collection supporting automatic JIT parallelization in JVM", Computer Science, Jun. 26, 2012, pp. 29.

Osterlund E., "Going Beyond On-The-Fly Garbage Collection and Improving Self-Adaptation with Enhanced Interfaces", Computer Science, 2019, pp. 68.

Osterlund et al., "Block-Free Concurrent GC: Stack Scanning and Copying," International Symposium on Memory Management, vol. 51, 2016, 12 pages.

Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.

Pufek et al., "Analysis of Garbage Collection Algorithms and Memory Management in Java", 2019 42nd International Convention on Information and Communication Technology, Electronics and Microelectronics (MIPRO), Croatian Society MIPRO, May 20, 2019, pp. 1677-1682.

Robbin Ehn, "JEP 312: Thread-Local Handshakes," Hotspot Dash Dev at Openjdk Dot Java Dot Net, available at <http://openjdk.java.net/jeps/312>, 2018, 3 pages.

Rogers I., "Reducing and eliding read barriers for concurrent garbage collectors," ICOOOLPS '11: Proceedings of the 6th Workshop on Implementation, Compilation, Optimization of Object-Oriented Languages, Programs and Systems, Jul. 2011, Article No. 5, pp. 1-5.

Ryan Sciampacone et al, "Garbage collection in WebSphere Application Server V8, Part 2: Balanced garbage collection as a new option", IBM developerWorks, Aug. 3, 2011.

Saxena et al., "Key and Value Paired Data using Java Hash Table," International Journal of Engineering and Management Research, vol. 4, Issue 1, Feb. 2014, pp. 81-89.

Stefan Karlsson, JEP 439: Generational ZGC, Aug. 25, 2021, OpenJDK, available at: https://openjdk.org/jeps/439 (Year: 2021).

Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.

The Z Garbage Collector—Low Latency GC OpenJDK, available online at <http://cr.openjdk.java.net/~pliden/slides/ZGC-Jfokus-2018.pdf>, 2018, 96 pages.

* cited by examiner

Dereferenceable Reference
600

| Sign Extension 610 | Other/Unused 608 | Address 606 |

Non-addressable Portion 602 — Addressable Portion 604

Heap Reference
650

Transient Color 652

| Other/ Unused 608 | Address 606 | Remapping 654 | Marking 656 | Remembered Set 658 | Other/ Unused 660 |

CONCURRENT LAZY REFERENCE COUNTING IN AN OLD GARBAGE COLLECTION GENERATION

TECHNICAL FIELD

The present disclosure relates to generational garbage collection. In particular, the present disclosure relates to reference counting in an old garbage collection generation.

BACKGROUND

A compiler converts source code, which is written according to a specification directed to the convenience of the programmer, to machine code (also referred to as "native code" or "object code"). Machine code is executable directly by a physical machine environment. Additionally or alternatively, a compiler converts source code to an intermediate representation (also referred to as "virtual machine code/instructions"), such as bytecode, which is executable by a virtual machine that is capable of running on top of a variety of physical machine environments. The virtual machine instructions are executable by the virtual machine in a more direct and efficient manner than the source code. Converting source code to virtual machine instructions includes mapping source code functionality, according to the specification, to virtual machine functionality, which utilizes underlying resources (such as data structures) of the virtual machine. Often, functionality that is presented in simple terms via source code by the programmer is converted into more complex steps that map more directly to the instruction set supported by the underlying hardware on which the virtual machine resides.

A virtual machine executes an application and/or program by executing an intermediate representation of the source code, such as bytecode. An interpreter of the virtual machine converts the intermediate representation into machine code. As the application is executed, certain memory (also referred to as "heap memory") is allocated for objects created by the program. A garbage collection system may be used to automatically reclaim memory locations occupied by objects that are no longer being used by the application. Garbage collection systems free the programmer from having to explicitly specify which objects to deallocate. Generational garbage collection schemes are based on the empirical observation that most objects are used for only a short period of time. In generational garbage collection, two or more allocation regions (generations) are designated and are kept separate based on ages of the objects contained therein. New objects are created in the "young" generation that is regularly collected, and when a generation is full, the objects that are still referenced by one or more objects stored in an older-generation region are copied into (i.e., "promoted to") the next oldest generation. Occasionally a full scan is performed.

In garbage collection, reference counting tracks the number of references (a.k.a. pointers) to a given object from other objects. As long as at least one other object references an object, the referenced object is presumptively "live." Reference counting is an effective way of determining whether an object is garbage; if its reference counter reaches zero, then it is no longer reachable from any live object and the memory it occupies can be reclaimed for other uses. However, atomic reference counting (ARC) can be computationally expensive, as it requires additional operations every time the value of a reference changes. For example, if a field initially references object O1 and is subsequently changed to reference object O2, ARC both decrements the reference counter for object O1 and increments the reference counter for object O2. Over the course of program execution, these additional operations can be prohibitively expensive and result in degraded performance.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment and mean at least one. In the drawings.

DETAILED DESCRIPTION

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

1. GENERAL OVERVIEW
2. ARCHITECTURAL OVERVIEW
   2.1. EXAMPLE ARCHITECTURE
   2.2. EXAMPLE CLASS FILE STRUCTURE
   2.3. EXAMPLE VIRTUAL MACHINE ARCHITECTURE
   2.4. LOADING, LINKING, AND INITIALIZING

3. GARBAGE COLLECTION
4. LOAD AND WRITE BARRIERS
5. CONCURRENT LAZY REFERENCE COUNTING IN AN OLD GARBAGE COLLECTION GENERATION
   5.1. EXAMPLE OF ATOMIC REFERENCE COUNTING
   5.2. LAZY REFERENCE COUNTING
   5.3. GENERATION CROSSING
6. EXAMPLE EMBODIMENT
7. COMPUTER NETWORKS AND CLOUD NETWORKS
8. HARDWARE OVERVIEW
9. MISCELLANEOUS; EXTENSIONS

1. General Overview

One or more embodiments use concurrent lazy reference counting to track reference counts in an old garbage collection generation. Approaches described herein use remembered sets and allocated reference counting responsibilities between mutator threads and garbage collection threads. Specifically, mutator threads perform reference counting when accessing a slow-path write barrier. Given a series of assignments to a given field, intermediate reference count increments and decrements cancel each other out. One or more embodiments reduce the overhead associated with reference counting by avoiding the accounting for those intermediate assignments within a given garbage collection cycle. Thus, one or more embodiments allow for reference counting in an old garbage collection generation while avoiding much of the computational overhead associated with atomic reference counting.

One or more embodiments described in this Specification and/or recited in the claims may not be included in this General Overview section.

2. Architectural Overview 2.1. Example Architecture

Figure 1:
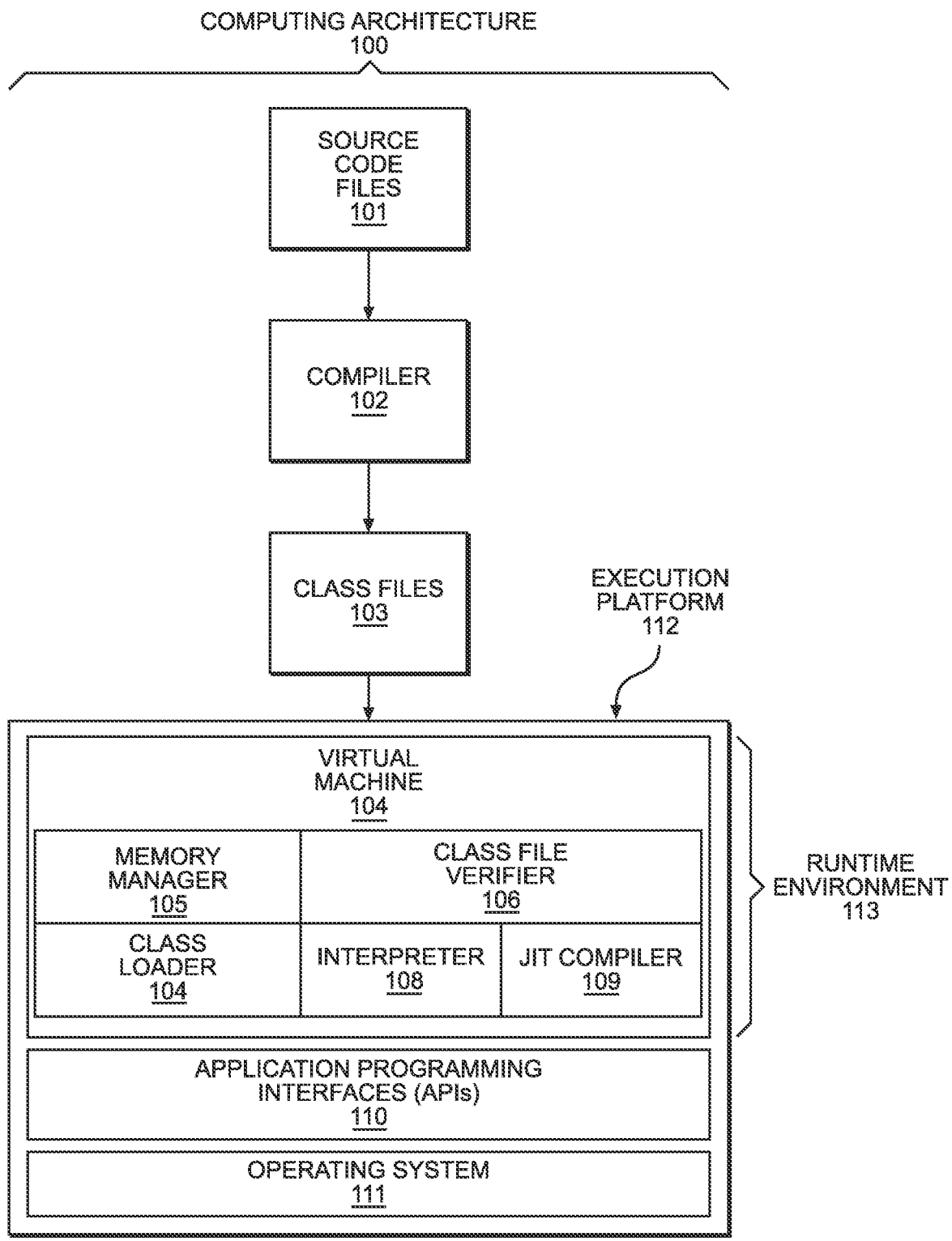
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.2. Example Class File Structure

Figure 2:
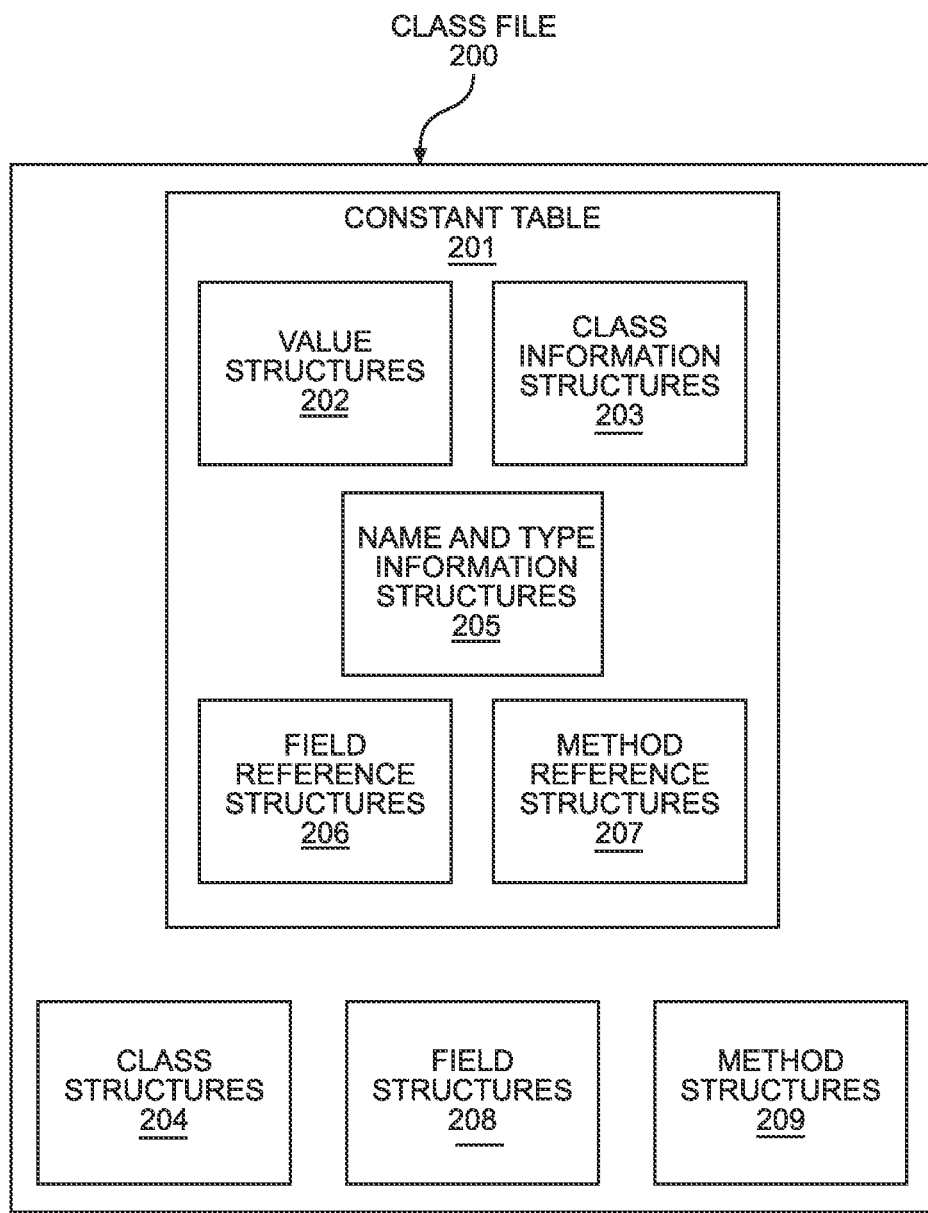
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
  int add12and13 ( ) {
    return B addTwo (12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I) I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.3. Example Virtual Machine Architecture

Figure 3:
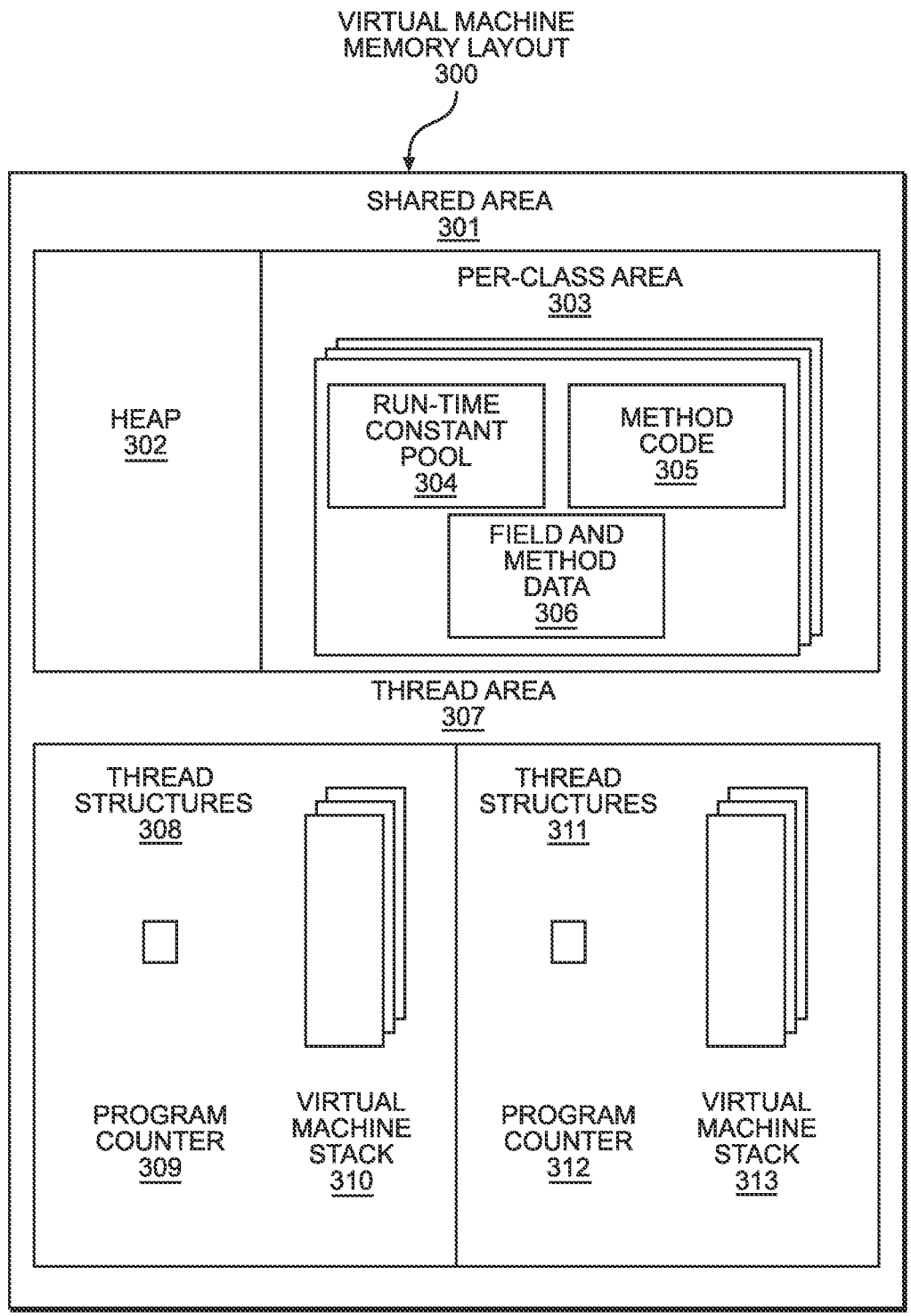
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
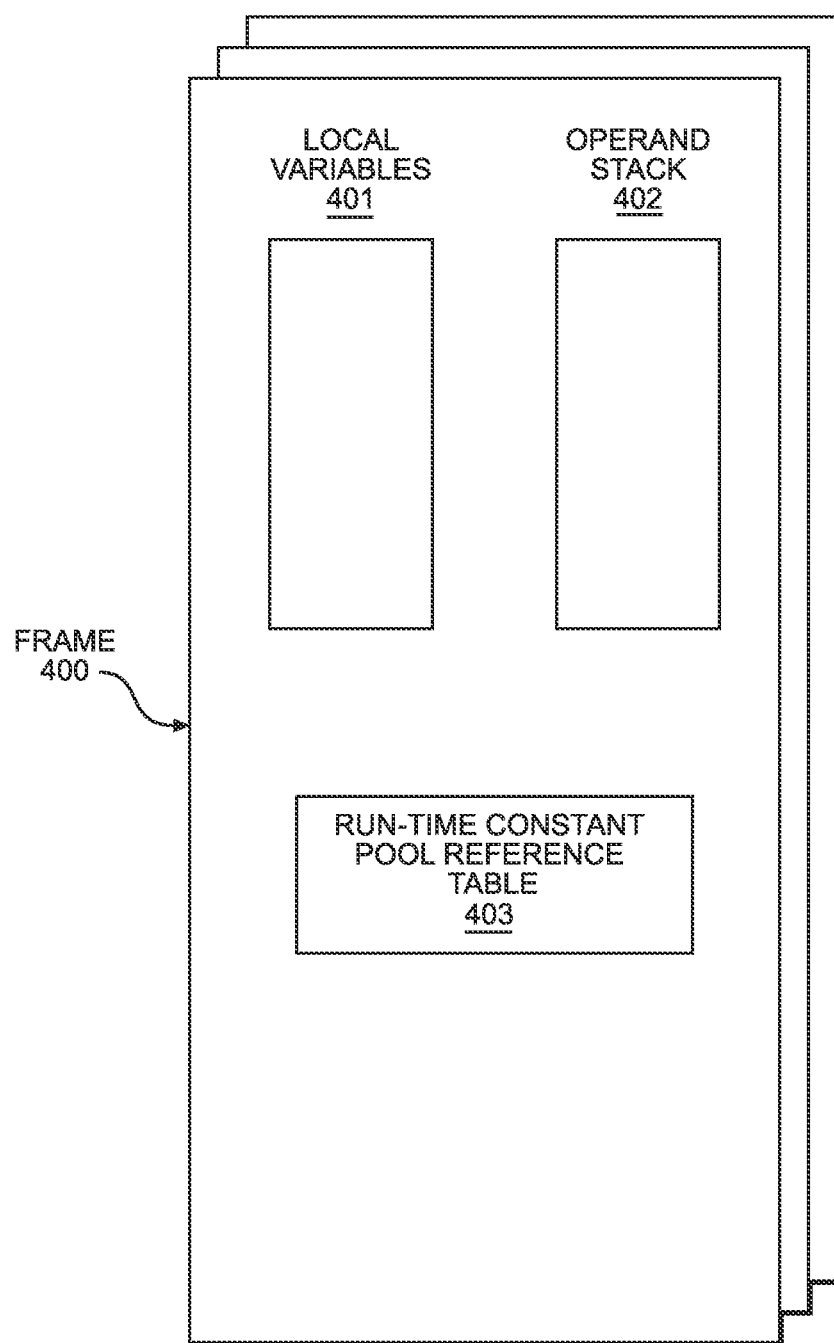
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.4. Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
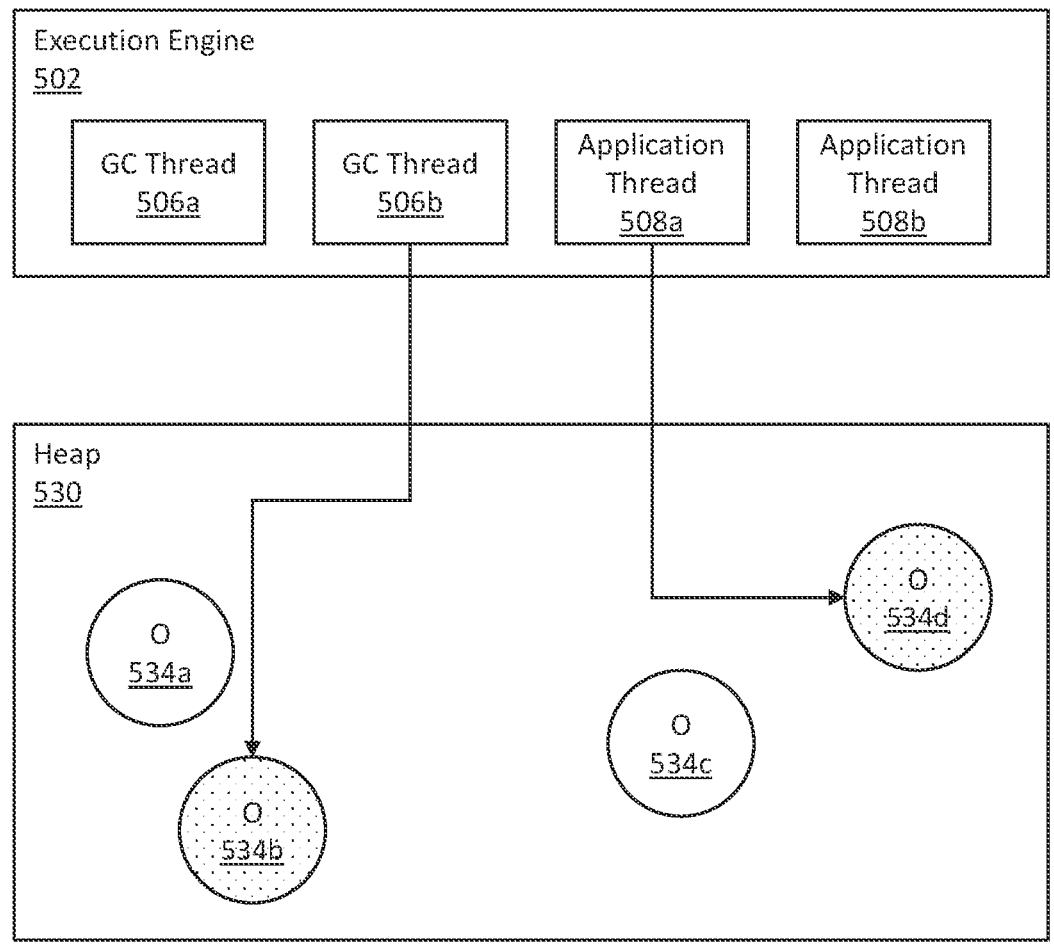
FIG. 5 illustrates an execution engine and a heap memory of a virtual machine according to an embodiment.

FIG. 5 illustrates an execution engine and a heap memory of a virtual machine according to an embodiment. As illustrated in FIG. 5, a system 500 includes an execution engine 502 and a heap 530. The system 500 may include more or fewer components than the components illustrated in FIG. 5. The components illustrated in FIG. 5 may be local to or remote from each other.

In one or more embodiments, a heap 530 represents the run-time data area from which memory for class instances and arrays is allocated. An example of a heap 530 is described above as heap 302 in FIG. 3.

A heap 530 stores objects 534*a-d* that are created during execution of an application. An object stored in a heap 530 may be a normal object, an object array, or another type of object. A normal object is a class instance. A class instance is explicitly created by a class instance creation expression. An object array is a container object that holds a fixed number of values of a single type. The object array is a particular set of normal objects.

A heap 530 stores live objects 534*b*, 534*d* (indicated by the dotted pattern) and unused objects 534*a*, 534*c* (also referred to as "dead objects," indicated by the blank pattern). An unused object is an object that is no longer being used by any application. A live object is an object that is still being used by at least one application. An object is still being used by an application if the object is (a) pointed to by a root reference or (b) traceable from another object that is pointed to by a root reference. A first object is "traceable" from a second object if a reference to the first object is included in the second object.

Sample code may include the following:
class Person {public
   String name;
   public int age;
   public static void main (String [ ] args) {
     Person temp=new Person ( );
     temp. name="Sean";
     temp. age=3;
   }
}

An application thread 508*a* executing the above sample code creates an object temp in a heap 530. The object temp is of the type Person and includes two fields. Since the field age is an integer, the portion of the heap 530 that is allocated for temp directly stores the value "3" for the field age. Since the field name is a string, the portion of the heap 530 that is allocated for temp does not directly store the value for the name field; rather the portion of the heap 530 that is allocated for temp stores a reference to another object of the type String. The String object stores the value "Sean." The String object is referred to as being "traceable" from the Person object.

In one or more embodiments, an execution engine 502 includes one or more threads configured to execute various operations. As illustrated, for example, an execution engine 502 includes garbage collection (GC) threads 506*a-b* and application threads 508*a-b*.

In one or more embodiments, an application thread 508*a-b* is configured to perform operations of one or more applications. An application thread 508*a-b* creates objects during run-time, which are stored onto a heap 530. An application thread 508*a-b* may also be referred to as a "mutator," because an application thread 508*a-b* may mutate the heap 530 (during concurrent phases of GC cycles and/or between GC cycles).

In one or more embodiments, a GC thread 506*a-b* is configured to perform garbage collection. A GC thread 506*a-b* may iteratively perform GC cycles based on a schedule and/or an event trigger (such as when a threshold allocation of a heap (or region thereof) is reached). A GC cycle includes a set of GC operations for reclaiming memory locations in a heap that are occupied by unused objects.

In an embodiment, multiple GC threads 506*a-b* may perform GC operations in parallel. The multiple GC threads 506*a-b* working in parallel may be referred to as a "parallel collector."

In an embodiment, GC threads 506*a-b* may perform at least some GC operations concurrently with the execution of application threads 508*a-b*. The GC threads 506*a-b* that operate concurrently with application threads 508*a-b* may be referred to as a "concurrent collector" or "partially-concurrent collector."

In an embodiment, GC threads 506*a-b* may perform generational garbage collection. A heap is separated into different regions. A first region (which may be referred to as a "young generation space") stores objects that have not yet satisfied criteria for being promoted from the first region to a second region; a second region (which may be referred to as an "old generation space") stores objects that have satisfied the criteria for being promoted from the first region to the second region. For example, when a live object survives at least a threshold number of GC cycles, the live object is promoted from the young generation space to the old generation space.

Various different GC processes for performing garbage collection achieve different memory efficiencies, time efficiencies, and/or resource efficiencies. In an embodiment, different GC processes may be performed for different heap regions. As an example, a heap may include a young generation space and an old generation space. One type of GC process may be performed for the young generations space. A different type of GC process may be performed for the old generation space. Examples of different GC processes are described below.

As a first example, a copying collector involves at least two separately defined address spaces of a heap, referred to as a "from-space" and a "to-space." A copying collector identifies live objects stored within an area defined as a from-space. The copying collector copies the live objects to another area defined as a to-space. After all live objects are identified and copied, the area defined as the from-space is reclaimed. New memory allocation may begin at the first location of the original from-space.

Copying may be done with at least three different regions within a heap: an Eden space, and two survivor spaces, S1 and S2. Objects are initially allocated in the Eden space. A GC cycle is triggered when the Eden space is full. Live objects are copied from the Eden space to one of the survivor spaces, for example, S1. At the next GC cycle, live objects in the Eden space are copied to the other survivor space, which would be S2. Additionally, live objects in S1 are also copied to S2.

As another example, a mark-and-sweep collector separates GC operations into at least two stages: a mark stage and a sweep stage. During the mark stage, a mark-and-sweep collector marks each live object with a "live" bit. The live bit may be, for example, a bit within an object header of the live object. During the sweep stage, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

A mark-and-sweep collector may be implemented as a parallel collector. Additionally or alternatively, a mark-and-sweep collector may be implemented as a concurrent collector. Example phases within a GC cycle of a concurrent mark-and-sweep collector include:

Phase 1: Identify the objects referenced by root references (this is not concurrent with an executing application).

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Sweep the heap to obtain free lists and reclaim memory (this may be concurrent)

As another example, a compacting collector attempts to compact reclaimed memory areas. A heap is partitioned into a set of equally sized heap regions, each a contiguous range of virtual memory. A compacting collector performs a concurrent global marking phase to determine the liveness of objects throughout the heap. After the marking phase completes, the compacting collector identifies regions that are mostly empty. The compacting collector collects these regions first, which often yields a large amount of free space. The compacting collector concentrates its collection and compaction activity on the areas of the heap that are likely to be full of reclaimable objects, that is, garbage. The compacting collector copies live objects from one or more regions of the heap to a single region on the heap, and in the process both compacts and frees up memory. This evacuation may be performed in parallel on multiprocessors to decrease pause times and increase throughput.

Example phases within a GC cycle of a concurrent compacting collector include:

Phase 1: Identify the objects referenced by root references (this is not concurrent with an executing application).

Phase 2: Mark reachable objects from the objects referenced by the root references (this may be concurrent)

Phase 3: Identify objects that have been modified as part of the execution of the program during Phase 2 (this may be concurrent)

Phase 4: Re-mark the objects identified at Phase 3 (this is not concurrent)

Phase 5: Copy live objects from a source region to a destination region, to thereby reclaim the memory space of the source region (this is not concurrent)

As another example, a load-barrier collector marks and compacts live objects but lazily remaps references pointing to the relocated objects. A load-barrier collector relies on "colors" embedded within references stored on the heap. A color represents a GC state, and tracks a progress of GC operations with respect to a reference. A color is captured by metadata stored within certain bits of a reference.

At every moment in time, all GC threads 506*a-b* agree on what color is the "good color," or "good GC state." A GC thread 506*a-b* loading a reference from a heap 530 to a call stack first applies a check to determine whether a current color of the reference is good. Similarly, an application thread 508*a-b* loading a reference from a heap 530 to a call stack first applies a check to determine whether a current color of the reference is good. The check may be referred to as a "load barrier." A good-colored reference will hit a fast path that incurs no additional work. Otherwise, the reference will hit a slow path. The slow path involves certain GC operations that bring the reference from the current GC state to the good GC state. The slot where the reference resides in the heap 530 is updated with a good-colored alias to avoid hitting the slow path subsequently (updating to a good color may also be referred to as "self-healing").

For example, a stale reference (a reference to an object that has been moved concurrently during compaction, meaning the address may point to an outdated copy of the object, or another object, or even nothing) is guaranteed to not have the good color. An application thread attempting to load the reference from a heap first executes a load barrier. Through the load barrier, the reference is identified as stale (not being of a good color). The reference is hence updated to point to the new location of the object and to be associated with the good color. The reference with the updated address and the good color is stored into the heap. The reference with the updated address may also be returned to the application thread. However, the reference returned to the application thread does not necessarily include any color.

Additional and/or alternative types of GC processes, other than those described above, may be used. Other types of GC processes may also rely on "colors" of references, or metadata relating to garbage collection stored within references.

In an embodiment, a color is stored with a heap reference but is not stored with a dereferenceable reference. The term "heap reference" refers to a reference stored on a heap 530. The term "dereferenceable reference" refers to a reference that an execution engine uses to access a value of an object being pointed to by the reference. Obtaining a value of an object being pointed to by a reference is referred to as "dereferencing" the reference. A GC thread 506*a-b* attempting to dereference a reference stored on a heap 530 first loads the reference from the heap 530 to a call stack of the GC thread 506*a-b*. An application thread 508*a-b* attempting to dereference a reference stored on a heap 530 first loads the reference from the heap 530 to a call stack of the application thread 508*a-b*. (For example, an application thread loads the reference into local variables 401, within frame 400, of a call stack, as described above with reference to FIG. 4.) Heap references and/or dereferenceable references are generally referred to herein as "references."

Figure 6:
FIG. 6 illustrates a heap reference and a dereferenceable reference according to an embodiment.
Figure 6:

Referring to FIG. 6, FIG. 6 illustrates a heap reference and a dereferenceable reference according to an embodiment. A reference may include any number of bits, depending on the computing environment. In an Intel x86-64 machine, for example, a reference has 64 bits.

In an embodiment, a dereferenceable reference 600 includes a non-addressable portion 602 and an addressable portion 604. An addressable portion 604 defines the maximum address space that can be reached by the reference 600. Depending on the hardware system upon which an application executes, a non-addressable portion 602 may be required to comply with canonical form before the reference 600 is dereferenced. If such a requirement is imposed, the hardware system (such as a processor) generates an error when attempting to dereference a non-compliant dereferenceable reference. Hence, the non-addressable portion 602 of the reference 600 cannot be used for storing any GC-related metadata, such as GC states. In an Intel x86-64 machine, for example, an addressable portion of a reference has 48 bits, and a non-addressable portion has 16 bits. Based on the restrictions imposed by the hardware, a reference can reach at most 248 unique addresses. Canonical form requires that the non-addressable portion be a sign extension 610 of the value stored in the addressable portion (that is, the high-order bits 48 through 63 must be copies of the value stored in bit 47).

As illustrated, addressable portion 604 includes address 606 and optionally other bits 608. The address 606 refers to the address of the object being pointed to by reference 600. The other bits 608 may be unused. Alternatively, the other bits 608 may store metadata, which may be but is not necessarily related to garbage collection.

As described above, dereferenceable references 600 include references stored on call stacks. Additionally or alternatively, dereferenceable references 600 include references embedded within compiled methods stored on a code cache and/or other memory location. A compiled method is a method that has been converted from a higher-level language (such as bytecode) to a lower-level language (such as machine code). An application thread may directly access a compiled method within the code cache, or other memory location, to execute the compiled method. As an example, a compiled method may be generated by a JIT Compiler 109 of FIG. 1. As another example, a compiled method may be generated by another component of a virtual machine.

In an embodiment, a heap reference 650 includes transient color bits 652, address bits 606 and optionally other bits 608. Transient color 652 represents a GC state that tracks a progress of GC operations with respect to reference 650. Color 652 is "transient" because the color 652 need not stay with the reference when the reference is loaded from a heap 530 to a call stack. The other bits 608 may be unused. Alternatively, the other bits 608 may store metadata, which may be but is not necessarily related to garbage collection. In embodiments, the transient color 652 is stored in the lowest-order (right-most) bits of the heap reference 650. For example, the transient color 652 may be two bytes in length, and is stored in bits 0-15 of the heap reference 650.

In an embodiment, transient colors 652 include one or more remapping bits 654. In embodiments, the remapping bits 654 provide, for each generation of the GC, an indication of a current relocation phase of that generation in the GC. In embodiments, the GC includes two generations (e.g., a young generation and an old generation), and the remapping bits include a number of bits sufficient to describe the current relocation phase of both the young generation and the old generation. For example, the remapping bits may include 4 bits. In embodiments, the remapping bits 654 are stored in the highest-order portion of the transient color 652. For example, where the transient color 652 is stored in bits 0-15 of the heap reference 650, the remapping bits 654 may make up bits 12-15 of the heap reference 654.

The transient color 652 may optionally include additional color bits, including one or more marking bits 656, one or more remembered set bits 658, and one or more other bits 660. In an embodiment, the remapping bits 654 may represent a relocation phase of the GC. In a multi-generational GC, the remapping bits 654 may represent a relocation phase of each generation of the GC. The remapping bits will be described in greater detail below.

In an embodiment, the marking bits 656 may represent a marking parity of the GC. In a multi-generational GC, the marking bits 656 may include a representation of marking parities of different generations of the GC. For example, in a GC that includes a young generation and an old generation, the marking bits 656 may include two bits for representation of a marking parity in the young generation and two bits for representation of a marking parity in the old generation. In another example embodiment, the marking bits 656 may include a first set of bits which represent a marking parity of young generation GC operations, and a second set of marking bits which represent parity of full-heap GC operations (which may include either only the old generation, or both the old generation and the young generation).

In an embodiment, the remembered set bits 658 may represent a remembered set phase of the GC. As a particular example, the remembered set bits may be two bits, with a single bit being set representing a phase of the remembered set. The remembered set bits indicate potential references from the old generation into the young generation.

In embodiments the other bits 660 may be used to represent other features of the GC state. Alternatively, the other bits 660 may not be used. In some embodiments, a number of other bits 660 may be determined such that a number of bits in the transient colors 652 is a whole number of bytes (e.g., the number of bits is divisible by 8). For example, the number of bits in the transient colors 652 may be 8 bits or 16 bits. In still another embodiment, transient colors 652 may represent a different set of GC states altogether. Transient colors 652 may represent GC states used in additional and/or alternative types of GC processes.

In embodiments, a GC cycle may include a plurality of phases. In some embodiments, a GC system may include separate GC cycles for each generation designated in the heap. For example, the GC system may include a young generation cycle and an old generation cycle. The young generation GC cycle may include the following phases: Mark Start, Concurrent Mark, Relocate Start, Concurrent Relocate. In some embodiments, the old generation GC cycle is symmetric to the young generation GC cycle, and may include the same phases. In some embodiments, each phase is executed concurrently, meaning that one or more application threads 508a, 508b may continue execution during the phase. In other embodiments, one or more of the phases (e.g., Mark Start, Relocate Start) may be non-concurrent. All application threads 508a-b must pause during a non-concurrent phase (also referred to as a "stop-the world pause" or "STW pause"). In some embodiments, a GC cycle (e.g., a young generation GC cycle or an old generation GC cycle) begins when objects on the heap assigned to a particular generation exceed a storage threshold, or after a particular time period has elapsed without a GC cycle.

Detailed discussion of the phases follows. Additional and/or alternative operations, other than what is discussed below, may also be performed in each phase.

Mark Start: During the Mark Start phase, the GC updates one or more constants (e.g., the "good color") by updating a marking parity and/or a remembered set parity for the young generation. During Mark Start, the GC may capture a snapshot of the remembered set data structure.

Concurrent Mark: The GC threads 506a-b perform object graph traversal to identify and mark all live objects. The GC threads trace through a transitive closure of the heap 530, truncating any traversal that leads outside the young generation. If a stale reference is found in the heap 530 during this process, the reference is updated with the current address of the object it refers to. The reference in the heap 530 is also updated to indicate the good color.

Optionally, per-page liveness information (the total number and the total size of live objects on each memory page) is recorded. The liveness information may be used to select pages for evacuation.

Mark End: The GC threads 506a-b mark any enqueued objects and trace a transitive closure of the enqueued objects, and confirm that marking is complete.

Relocate Start: During Relocate Start, the GC updates one or more constants (e.g., the "good color") by updating at least the remapping bits. In an embodiment, the GC threads 506a-b select an empty region as a to-space. In another embodiment, additional and/or alternative methods may be used for selecting a to-space for the relocated objects.

Concurrent Relocation: Marked from-space objects may be relocated to the selected to-space (possibly with in-place compaction in particular situations). Every object that gets moved and contains a stale pointer into the currently relocating young generation gets added to the remembered set. This helps to ensure that pointers get remapped subsequently.

4. Load and Write Barriers

In one or more embodiments, a GC cycle includes one or more concurrent phases. During a concurrent phase, one or more application threads may execute concurrently with one or more GC threads. When an application thread attempts to load a reference from a heap to a call stack, the application thread may execute a reference load barrier. When an application thread attempts to write a reference onto a heap, the application thread may execute a reference write barrier.

Figure 7:
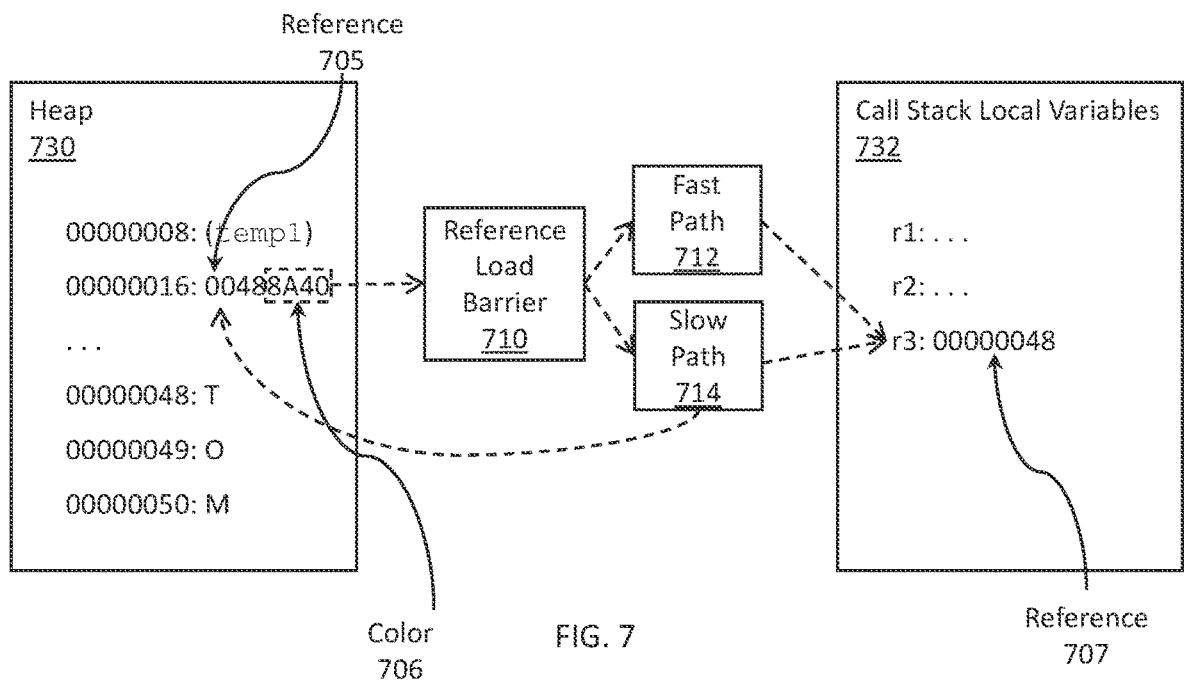
FIG. 7 illustrates a reference load barrier according to an embodiment.

FIG. 7 illustrates a reference load barrier according to an embodiment. As illustrated, a heap 730 includes addresses 00000008, 00000016, . . . 00000048, 00000049, 00000050. Call stack local variables 732 include registers r1, r2, r3. In the example, references include 32 bits. Colors of heap references may be indicated by bits 0-15. For example, the color may include 4 remapping bits (e.g., bits 12-15) for indicating relocation phases of a young generation and an old generation, 4 marking bits (e.g., bits 8-11) for indicating marking parity in a young generation and an old generation, two remembered set bits (e.g., bits 6-7) for indicating remembered set parity in a GC, and six other bits (bits 0-5) that may be unused or may store other metadata.

Regarding the remapping bits, the bits may use a coding such that exactly one bit, from among the four remapping bits, is set, with the one set bit indicating the relocation phases of both young generation GC operations and full-heap GC operations (which may include either only the old generation, or both the old generation and the young generation). In particular, the four remapping bits can be represented as a four-digit binary number. For the remapping bits, the value 0001 may indicate that the full heap relocation is in an even phase and the young generation relocation is in an even phase; the value 0010 may indicate that the full heap relocation is in an even phase and the young generation relocation is in an odd phase; the value 0100 may indicate that the full heap relocation is in an odd phase and the young generation relocation is in an even phase; the value 1000 may indicate that the full heap relocation is in an odd phase and the young generation relocation is in an odd phase. Thus, the four possible values that include exactly one set bit represent each of the possible combinations of relocation phases within the old generation and the young generation.

The GC may also set a shift value that is one higher than a position of a particular bit, from among the remapping bits, that is set in the currently good color. This ensures that the particular bit is the last bit shifted out of the address. For example, given that the remapping bits are bits 12-15, the shift value may be set to a value between 13 and 16, where a value of 13 corresponds to the bit 12 being the set bit of the remapping bits, a value of 14 corresponds to the bit 13 being the set bit of the remapping bits, a value of 15 corresponds to the bit 14 being the set bit of the remapping bits, and a value of 16 corresponds to the bit 15 being the set bit of the remapping bits. In embodiments, the shift value changes at least at a start of each new GC relocation phase and may be set using, for example, compiled method entry barrier patching.

In embodiments, the address portion of a reference may overlap the color bits, beginning immediately following the set bit of the remapping bits. Accordingly, the address portion of the reference may begin anywhere between bit 13 and bit 16, depending on the position of the set bit in the remapping bits. However, any bits included within the overlap are set to zero. Accordingly, the method requires that the three lowest-order bits of each address be zero.

Sample code may include the following:

```
class Person {
  public String name;
  public static void main (String [ ] args) {
    Person temp1=new Person ( );
    . . .
    String temp2=temp1.name;
  }
}
```

Based on the code line Person temp1=new Person( ), an application thread creates a new object in a heap 730, and a reference temp1 refers to the new object. The object (referred to by temp1) is of the type Person and includes a name field of the type String. The object (referred to by temp1) is stored at address "00000008" within the heap 730. The name field of the object (referred to by temp1) is stored at address "00000016" within the heap 730. The name field is populated with a reference 705. The reference 705 includes a color 706 and points to address "0048." Hence, address "00000048" includes the value of the name of the object (referred to by temp1), and the value is "TOM."

Based on the code line String temp2=temp1.name, the application thread attempts to load the reference 705 in the name field of the object referred to by temp1. The application thread hits a reference load barrier 710. The reference load barrier 710 includes instructions to check whether the color 706 of the reference 705 includes remapping bits that match the current relocation phases of both the young generation and the old generation. In particular, the instructions determine whether the correct bit, from among the remapping bits, is set.

To accomplish this, a logical bit-wise right shift operation is applied to the reference 705. The system may shift the reference to the right n times, where n is equal to the shift value set by the GC. Each bit is shifted to the right n places, and n bits having a default value are inserted in the left-most (e.g., highest-order) bits. For example, if a canonical form would require that the highest-order bits are 0s, the shift operation may insert n 0s into the left-most bits. Because the color 706 is stored in the lowest-order (right-most) bits of the reference 705, the right shift operation applied to the reference has the effect of removing the color bits 706. Moreover, because the remapping bits are stored at the highest-order portion of the color, the remapping bits are the last one or more bits removed by the right shift operation. In particular, the shift value set by the GC corresponds to the position of the exactly one bit, of the remapping bits, that is set in the current "good color."

The system may then determine if the last bit shifted out of the reference was set (e.g., indicating that the correct bit of the remapping bits is set). For example, in an x86-64 architecture, the system may determine if the carry flag and zero flags are set. After a bit-wise right shift operation in the x86-64 architecture, the carry flag is equal to the last bit shifted out of the reference, and the zero flag is set if all bits in the reference, after the shift operation is completed, are 0. Accordingly, the carry flag is set when the correct bit, of the remapping bits, is set; the zero flag is set when the reference is a reference to a null value (e.g., the address 0). If the carry flag is not set and the zero flag is not set, the application thread takes a slow path 714. In other cases (e.g., the carry flag is set, or the zero flag is set), the application thread takes a fast path 712. In other system architectures, other techniques may be used to determine if the last bit shifted out of the reference was set.

The fast path 712 does not necessarily involve any GC operations, such as remapping references and/or marking objects as live. The color 706 has been removed from the reference 705 by the right shift operation. The result "00000048" is saved as reference 707 in the call stack local variables 732, such as at r3. The application thread may then dereference the reference 707. The application thread accesses the address indicated by the reference 707, that is address "00000048" within the heap 730. The application thread obtains the value "TOM" at address "00000048" within the heap 730.

When the system determines that the application thread should take a slow path, the application thread may select one of a pool of slow paths. In particular, the application thread may reload the reference and select a slow path from the pool of slow paths based on the color 706. The application thread may, for example, remap an address indicated by the reference 705. The application may, for example, mark an object pointed to by the reference 705 as live. Then the application thread may update the color 706 of the reference 705 to be the good color. Additionally the application thread may remove the color 706 from the reference 705 for storage in the call stack local variables 732, as described above. In particular, the application thread may apply a logical bit-wise right shift operation to the reference 705. The system may shift the reference to the right n times, where n is equal to the shift value set by the GC.

Figure 8:
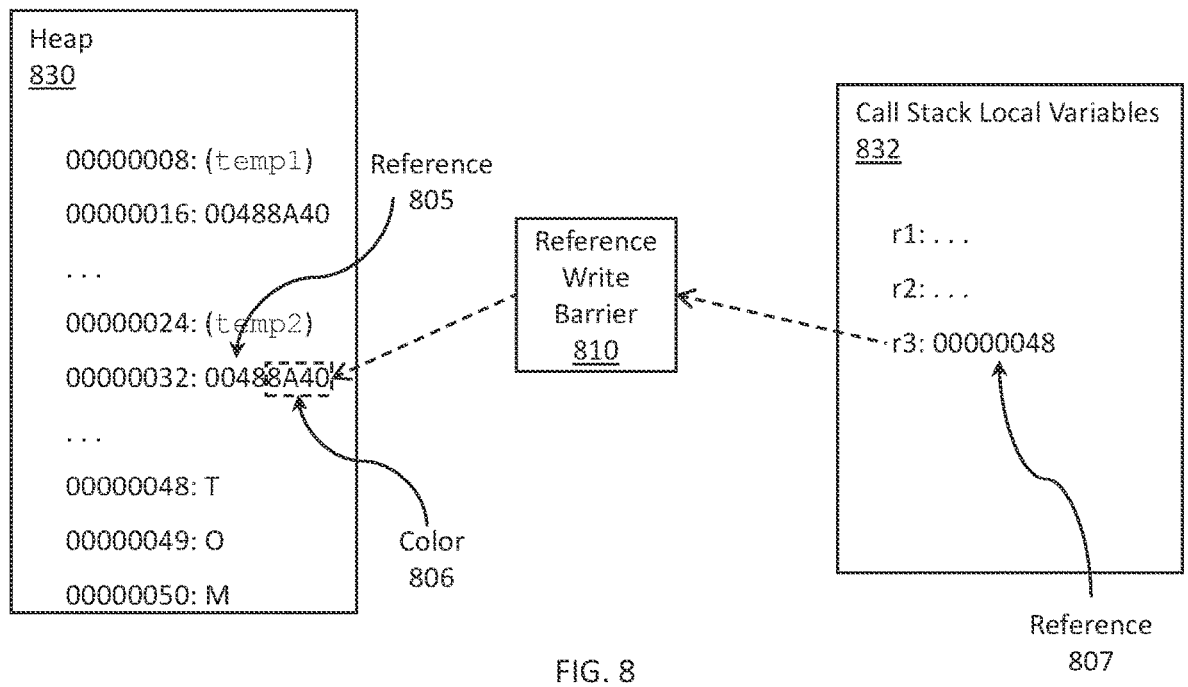
FIG. 8 illustrates a reference write barrier according to an embodiment.

FIG. 8 illustrates a reference write barrier according to an embodiment. As illustrated, a heap 830 includes addresses 00000008, 00000016, . . . 00000024, 00000032, . . . 00000048. Call stack local variables 832 include registers r1, r2, r3. In the example, references include 32 bits. Colors of heap references may be indicated by bits 0-15.

Sample code may include the following:

```
class Person {
  public String name;
  public static void main (String [ ] args) {
    Person temp1=new Person ( );
    Person temp2=new Person ( );
    . . .
    String temp3=temp1.name;
    temp2.name=temp3;
  }
}
```

Based on the code line Person temp2=new Person ( ), an application thread creates a new object in a heap 830, and a reference temp2 refers to the new object. The object (referred to by temp2) is of the type Person and includes a name field of the type String. The object (referred to by temp2) is stored at address "00000024" within the heap 830. The name field of the object (referred to by temp2) is stored at address "00000032" within the heap 830. The name field is populated with a reference 805.

Based on the code line temp2.name=temp3, the application thread attempts to write a reference 807 from call stack local variables 832 into the heap 830. In particular, the application thread attempts to write the reference 807 to address "00000032," the location where the name field for the object referred to by temp2 is stored.

The application thread hits a reference write barrier 810. The reference write barrier 810 includes instructions to add a color 806 to the reference 807. In particular, the application thread determines which color is currently the good color based on the current GC phase. Then the application thread tints the reference 807 with the good color. Tinting the reference 807 with the good color may include: (a) applying a bitwise left shift operation to the reference to shift the reference to the left n times, where n is equal to the shift value set by the GC and insert n 0s in the lowest-order bits of the reference, and (b) applying a logical bit-wise OR to the result of the left shift and a good color bit mask that includes the good color set by the GC in the lowest-order bits (e.g., bits 0-15) and a 0 in each other bit. The result of the OR is "00488A40." The application thread writes the result "00488A40" to the address "00000032" in the heap 830.

5. Concurrent Lazy Reference Counting in an Old Garbage Collection Generation If an object in the old generation has zero inbound references from other objects in the old generation ("old-to-old references" or "old-to-old pointers"),zero inbound references from objects in the young generation ("young-to-old references" or "young-to-old pointers"), and zero roots outside of the heap, then that object is dead and its memory can be freed. Young generation collection (also referred to as "minor" collection) traces young-to-old references. Along with tracking root-to-old references, if old-to-old reference counts were also available during minor collection, then dead objects in the old generation could also be garbage-collected during minor collection. Atomic reference counting (ARC) can be used to track both root-to-old and old-to-old reference counts. However, as discussed above, ARC can be prohibitively expensive.

5.1. Example of Atomic Reference Counting

The following example illustrates the costliness of ARC. In this example, at a young mark start safepoint M0, an old generation object graph has a state S0. At the next young mark start safepoint M1, the old generation object graph has a state S1. At S0, a field F in the old generation points to object O0. Between S0 and S1, one or more mutator threads change F to point to another object O1, then O2, and then O3. Using ARC, these mutations would require the following operations to decrement and increment the reference counts for each of objects O0, O1, O2, and O3:

--------------------S0
O0--
O1++
O1--
O2++
O2--
O3++
--------------------S1

In this example, all the counter updates except for the first and last ones (O0-- and O3++) cancel each other out: O1++ is canceled out by O1-- and O2++ is canceled out by O2--. Therefore, in this example, two-thirds of the reference counter updates introduce unnecessary computational cost.

5.2. Lazy Reference Counting

One or more embodiments use lazy reference counting to eliminate the unnecessary overhead of ARC (e.g., as illustrated in the example above), thus allowing for efficient garbage collection in the old generation during minor collection. As described below, lazy reference counting may use information stored in remembered sets, without adding any reference-counting operations to the fast-path write barrier. In addition, as described below, lazy reference counting may allocate responsibility for reference counting between mutator threads and garbage collection threads.

5.2.1. Remembered Sets

In an embodiment, a remembered set indicates memory addresses in the old generation that may include pointers to objects in the young generation. One or more embodiments maintain two remembered sets: a "previous" remembered set and a "current" remembered set. The garbage collector scans the previous remembered set, while mutator threads add entries to the current remembered set. The first time a field is mutated during a given garbage collection cycle (a.k.a. "epoch"), the slow-path write barrier adds a corresponding entry for that address to the current remembered set. For subsequent writes to that field during the same epoch, even if multiple threads are mutating the same field, the fast-path write barrier does not need to update the current remembered set. Adding an entry to the current remembered set may merely indicate that the field has mutated, without indicating whether the new value references an object in the young generation or the old generation. From one epoch to the next, the garbage collector may "flip" the remembered sets, so that the "current" remembered set becomes the "previous" remembered set.

In an embodiment, each remembered set is implemented as a byte array, referred to as a card table. Some card tables are coarse-grained, with each byte in the table corresponding to an address range (e.g., a 512-byte span) in the heap. One or more embodiments use a more precise bitmap with field-level accuracy, where each bit corresponds to a given address. Specifically, in an embodiment, a remembered set includes one bit in the bitmap for every 8 bytes of heap memory. Alternatively, one or more embodiments may store bits outside of the remembered set for reference tracking. However, if a remembered set with sufficient granularity is available, using the existing remembered set avoids additional memory overhead.

As shown in the ARC example above, only the first and last reference-counting operations—i.e., the first decrement and the last increment—are of interest for garbage collection, because the intervening increments and decrements cancel each other out. One or more embodiments use information stored in the remembered sets to account for the first decrement and the last increment, without needing to account for any intervening decrements or increments.

5.2.2. Mutator Thread Operations

Figure 9:
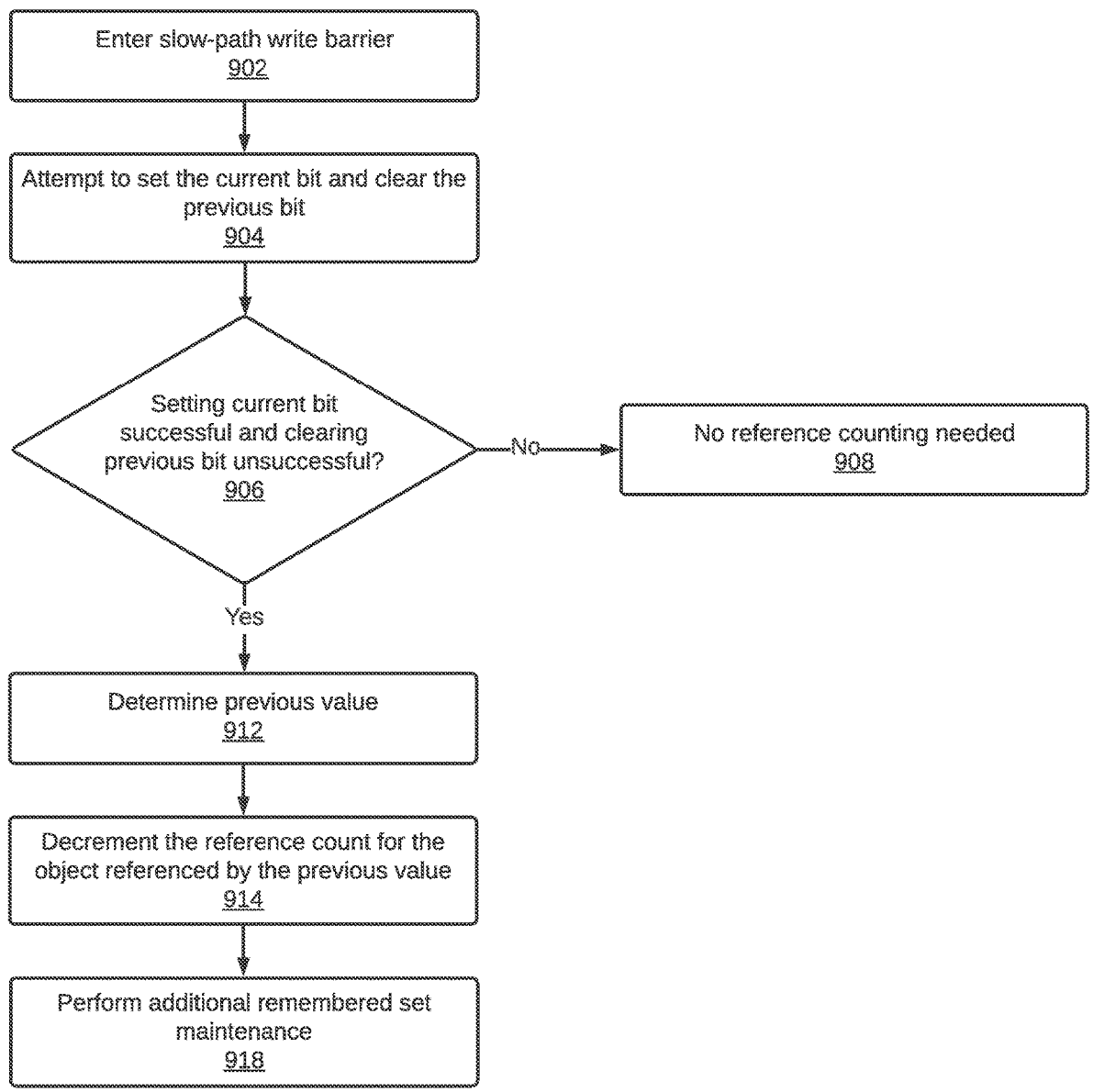
FIG. 9 illustrates an example set of operations for reference counting operations performed by a mutator thread in accordance with one or more embodiments.

As noted above, lazy reference counting may allocate responsibility for reference counting between mutator threads and garbage collection threads. FIG. 9 illustrates an example set of operations for reference counting operations performed by a mutator thread in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments.

In an embodiment, reference counting operations are performed by mutator threads only when accessing the slow-path write barrier. The description below refers only to reference counting operations; it is not an exhaustive description of operations performed by the slow-path write barrier.

In an embodiment, a mutator thread enters the slow-path write barrier (Operation 902) only on the first write to a given address in each epoch; subsequent writes to that address in the same epoch will enter the fast-path write barrier. However, when multiple mutator threads are executing simultaneously, a race condition may occur where two or more mutator threads enter the slow-path write barrier concurrently. If two or more mutator threads were to decrement the same reference count in the same epoch, then the resulting count would be inaccurate. One or more embodiments resolve the potential race condition by having each mutator thread that enters the slow-path write barrier attempt to (1) set the bit for the target address, i.e., the address of the field to which a value is being written, in the current remembered set and (2) clear the bit for the target address in the previous remembered set (Operation 904). Whether or not reference counting is needed depends on evaluating the results of these attempts (Operation 906).

Specifically, reference counting is needed only if (1) the attempt to set the current bit is successful, meaning that the current bit was not already set at the time of the attempt to set it, and (2) the attempt to clear the previous bit is not successful, meaning that the previous bit was not set at the time of the attempt to clear it. If setting the current bit is unsuccessful and/or clearing the previous bit is successful, then the slow-path write barrier determines that no reference counting is needed for this address (Operation 908). The following is an example of pseudocode that represents this determination, with the reference count being adjusted only if the criteria for winning the potential race condition are satisfied:

```
def slow_path_actions(object, field, previous_value) {
    . . .
    if (current_remset_bits.try_set_bit (field) &&
       !previous_remset_bits.try_clear_bit (field)) {
       object.ref_count--;
    }
}
```

Regarding the attempt to clear the previous bit, more specifically, if the previous bit is set at the time of the attempt to clear it, then a write to the address occurred in the prior epoch and the last increment from the prior epoch has not yet been accounted for. That is, the reference counter for the last-written object in the prior epoch has not been incremented. However, the fact that a new value is currently being written to that address means that the same reference counter now needs to be decremented; this corresponds to the first decrement of the current epoch. Because the last increment from the prior epoch and the first decrement from the current epoch cancel each other out, no reference counting is needed.

The mutator thread that successfully sets the current bit and clears the previous bit is also responsible for the reference counting operations discussed below. In an embodiment, the slow-path write barrier has access to the previous value of the address being written to, i.e., the value stored at that address at the end of the previous epoch. The system may store the previous value, for example, for use in snapshot-at-the-beginning (SATB) algorithms. Thus, the slow-path write barrier can determine the previous value (Operation 912) and decrement the reference count for the object referenced by the previous value (Operation 914).

In an embodiment, because responsibility for reference counting is allocated between mutator threads and garbage collection threads, remembered set maintenance can also be allocated between the threads. The slow-path write barrier may perform additional remembered set maintenance (Operation 918), including scanning the remembered set entry and taking the appropriate actions. This approach avoids redundant reference-counting operations between the mutator threads and garbage collector threads; garbage collection will not re-scan this remembered set entry during the current epoch.

5.2.3. Garbage Collection Thread Operations

Figure 10:
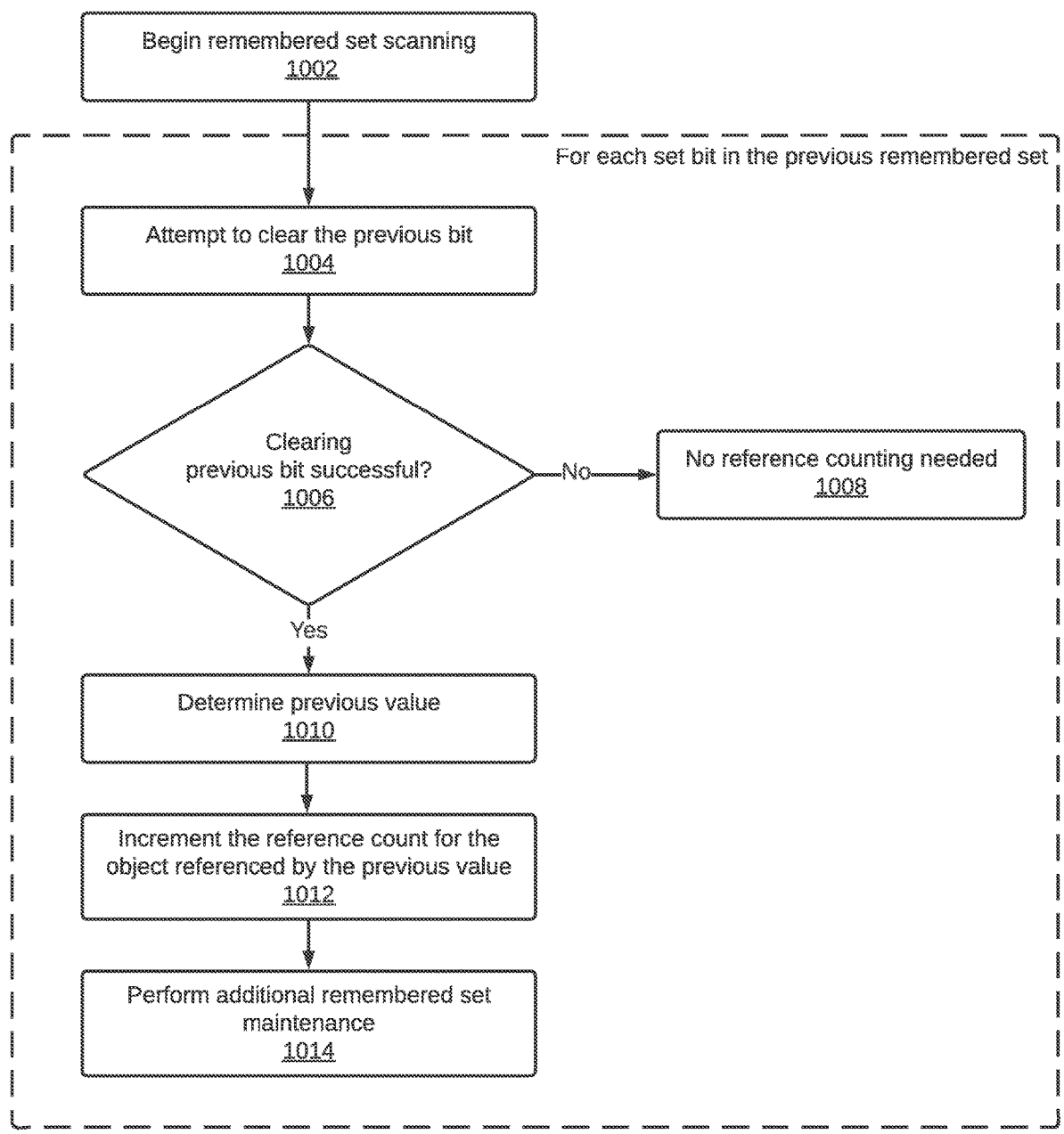
FIG. 10 illustrates an example set of operations for reference counting operations performed by a garbage collection thread in accordance with one or more embodiments.

FIG. 10 illustrates an example set of operations for reference counting operations performed by a garbage collection thread in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

In an embodiment, the garbage collection thread begins remembered set scanning (Operation 1002). Remembered set scanning inspects each bit in the previous remembered set and takes appropriate action if a given bit is set. The following discussion refers only to reference counting operations; it is not an exhaustive description of operations performed during remembered set scanning.

For each bit that is currently set in the previous remembered set (i.e., each bit indicating that there was a write to the corresponding address in the prior epoch), the garbage collection thread attempts to clear that bit (Operation 1004) and determines whether the attempt was successful (Operation 1006). This determination allows for the possibility that there may be a race condition where the slow-path write barrier clears the bit first, as described above. The attempt is only successful if the bit was still set at the time of the clear attempt, meaning that either (1) there was no race condition or (2) there was a race condition and remembered set scanning "won" the race. An unsuccessful attempt to clear the bit indicates that there was a race condition and remembered set scanning has "lost" the race, in which case the garbage collection thread determines that no further reference counting is needed for this address (Operation 1008); the accounting is handled instead by the slow-path write barrier that won the race.

If the attempt to clear the previous remembered set bit is successful, then remembered set scanning is responsible for accounting for the last increment from the prior epoch, i.e., incrementing the reference counter for the object referenced by the last write to that address in the prior epoch. The first decrement from the prior epoch will already have been accounted for by the slow-path write barrier when it was executed in the prior epoch.

As noted above, the system retains the previous value of the address being written to, i.e., the value stored at that address at the end of the previous epoch. The system may store the previous value, for example, for use in snapshot-at-the-beginning (SATB) algorithms. Thus, garbage collection thread can determine the previous value (Operation 1010) and increment the reference count for the object referenced by the previous value (Operation 1012). The garbage collection thread performs additional remembered set maintenance (Operation 1014).

5.3. Generation Crossing

In an embodiment, additional maintenance is needed when objects move across generations and/or point across generations. Specifically, additional maintenance may be needed when tracking young-to-old and root-to-old pointers, freeing old objects, and/or promoting new old objects. Each of these is described in further detail below.

5.3.1. Tracking Young-to-Old and Root-to-Old Pointers

In an embodiment, the lazy reference counting approach described herein is focused on managing old objects with reference counting. However, accounting is also needed for young-to-old and root-to-old pointers. In an embodiment, accounting for these pointers is performed during concurrent snapshot-at-the-beginning (SATB) marking of the young generation. Specifically, one or more embodiments generate a set abstract data structure that may be referred to as an "outside referenced set." For every field or root pointing into the old generation, one or more embodiments insert the corresponding old object into the set.

5.3.2. Freeing Old Objects

After the young relocation phase has finished, one or more embodiments perform sweeping of the old generation. Specifically, one or more embodiments iterate over the objects with a reference count of 0, meaning there are no old-to-old pointers to that object. One or more embodiments then reference the "outside referenced set," to determine if the object is in the set. If not, it is safe to free the object. When an old object is freed due to the reference counting logic, all of its referenced pointers may be dereferenced if old. This may transitively trigger recursive freeing and decrementing, until all old objects have been processed for a given snapshot.

When old objects are being freed, they may be part of an old generation tracing operation concurrently, and may be included in the snapshot being traced. To account for this possibility, one or more embodiments mark the object as live in the bitmap, preventing the concurrent old generation tracing from tracing through this object. One or more embodiments then scrape the fields and push them on marking stacks as appropriate, to maintain the SATB with respect to concurrent marking. This approach essentially unlinks the freed object from concurrent marking. In an embodiment, a rendezvous handshake with the old generation garbage collection threads is performed to recycle the memory for the freed old generation cells.

5.3.3. Promoting New Old Objects

In an embodiment, promoting an object from the young generation to the old generation means that new old-to-old pointers are being added. Pointers that were previously young-to-old are now old-to-old, and pointers that were previously old-to-young are now old-to-old, requiring further maintenance of the reference counters. For outgoing references from a promoted object, decrements are not desired; only increments for the last reference of each field are desired, before the next young mark start. To account for this, one or more embodiments insert promoted fields into the remembered set before the old version of the object is exposed to mutators. Thus, no other thread will account for any decrements until the subsequent young mark start, which is required for correctness. Moreover, in an embodiment, after the young mark start pause, the marking phase recognizes the previous bit and determines that the last increment needs to be recorded, which also is required for correctness.

6. Example Embodiment

Figure 11:
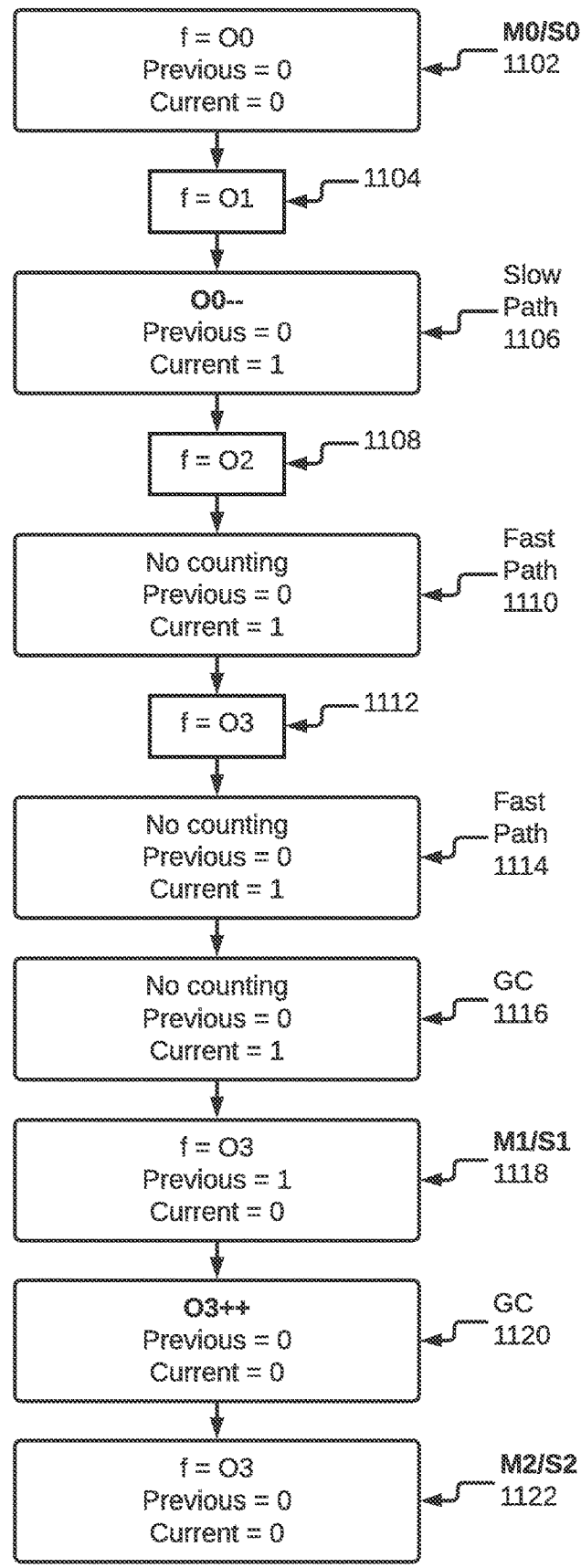
FIG. 11 illustrates an example of concurrent lazy reference counting in an old garbage collection generation, in accordance with one or more embodiments.

A detailed example is described below for purposes of clarity. Components and/or operations described below should be understood as one specific example which may not be applicable to certain embodiments. Accordingly, components and/or operations described below should not be construed as limiting the scope of any of the claims. Specifically, FIG. 11 illustrates an example of concurrent lazy reference counting in an old garbage collection generation, in accordance with one or more embodiments. In the example illustrated in FIG. 11, time proceeds from top to bottom and reference numerals refer to points in time.

At 1102, garbage collection enters a young mark start safepoint M0, and an old generation object graph has a state S0. At this time, object O0 is assigned to field f, which was written at some prior point; the reference count increment for the write was already accounted for, as indicated by the previous remembered set bit for f's address not being set (indicated by the numeral "0" in this example). The current remembered set bit also is not set.

At 1104, the system receives an instruction to write object O1 to f. To do so, at 1106, the system enters the slow-path write barrier. In this example, there is no race condition; the slow path sets the current remembered set bit for the field's address and, because the previous bit is not set, accounts for the first decrement (O0--).

At 1108, the system receives an instruction to write object O2 to f. Because this is not the first write to the address in this epoch, at 1110, the system enters the fast-path write barrier. No reference counting occurs and the remembered set bits are unchanged. Similarly, at 1112, the system receives an instruction to write object O3 to f. Because this is not the first write to the address in this epoch, at 1114, the system enters the fast-path write barrier. No reference counting occurs and the remembered set bits are unchanged.

At 1116, garbage collection occurs. Because the previous remembered set bit for this address is not set, no reference counting occurs for this address. At 1118, garbage collection enters another young mark start safepoint M1, and the old generation object graph has a state S1. The remembered sets are flipped, so that the previous remembered set bit for this address is now set, and the current remembered set bit is not set.

At 1120, garbage collection occurs before another write to f. Because the previous remembered set bit is set for the address, the garbage collection thread increments the reference counter for the object referenced by the previous value at the address (O3++). At 1122, garbage collection enters another young mark start safepoint M2, and the old generation object graph has a state S2. The remembered sets are flipped. Because no write occurred in the epoch between M1 and M2, the previous remembered set bit and the current remembered set bit both are not set.

Note that in this example, only two reference count adjustments occurred: O0-- and O3++. This is one-third of the reference count adjustments that would have been needed using atomic reference counting (ARC), with corresponding savings in compute resources.

7. Computer Networks and Cloud Networks

In an embodiment, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used.

In an embodiment, each tenant is associated with a tenant identifier (ID). Each network resource of the multi-tenant computer network is tagged with a tenant ID. A tenant is permitted access to a particular network resource only if the tenant and the particular network resources are associated with the same tenant ID.

In an embodiment, each tenant is associated with a tenant ID. Each application, implemented by the computer network, is tagged with a tenant ID. Alternatively or additionally, each data structure and/or dataset, stored by the computer network, is tagged with a tenant ID. A tenant is permitted access to a particular application, data structure, and/or dataset only if the tenant and the particular data structure and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Hardware Overview

According to one embodiment, the techniques described herein are implemented by one or more special-purpose computing devices. The special-purpose computing device(s) may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices, or any other device that incorporates hard-wired and/or program logic to implement the techniques.

Figure 12:
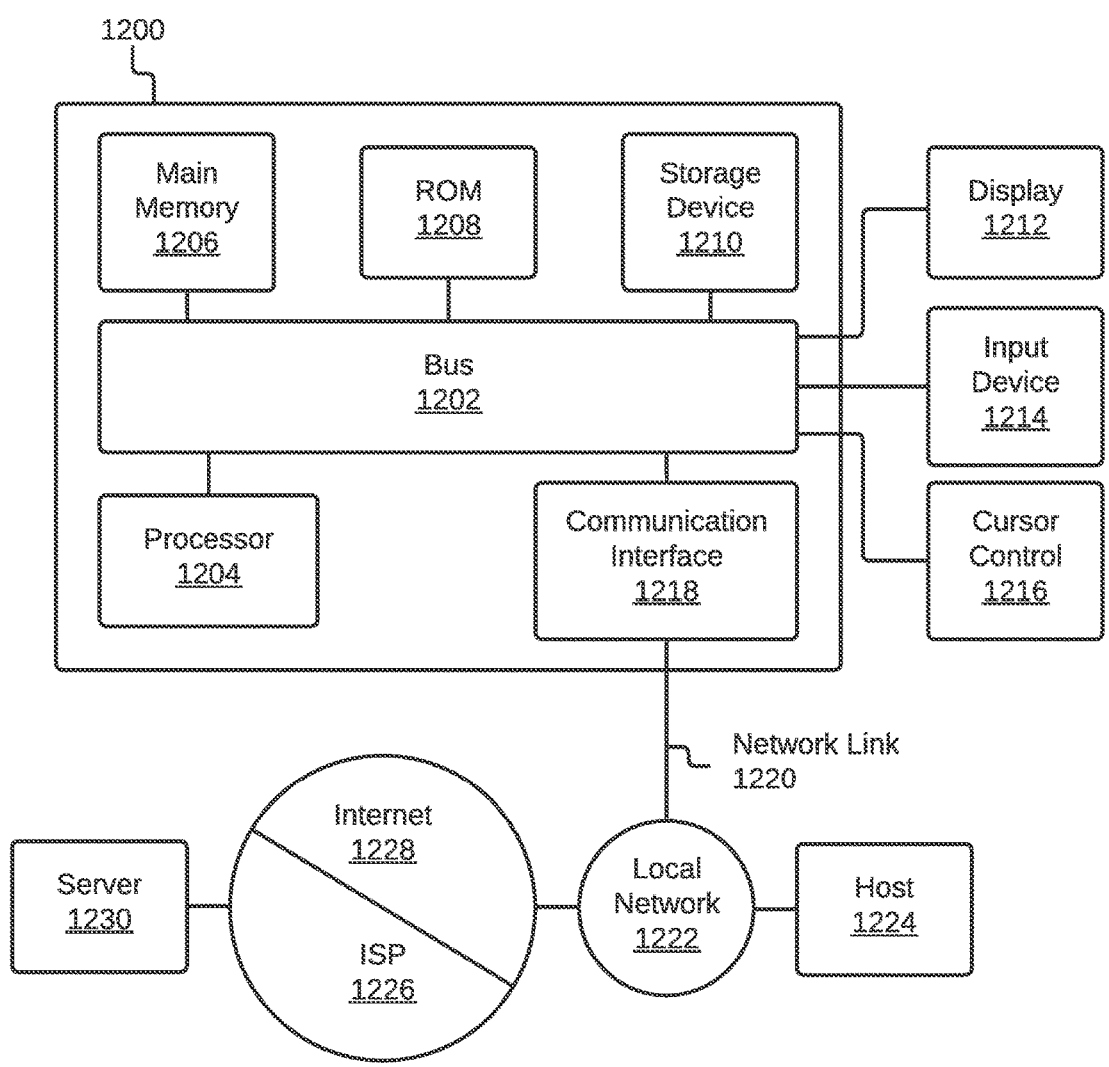
FIG. 12 shows a block diagram that illustrates a computer system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general-purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to the processor 1204, render computer system 1200 into a special-purpose machine that is customized to perform the operations specified in the instructions.

Computer system 1200 further includes a read only memory (ROM) 1208 or other static storage device coupled to the bus 1202 for storing static information and instructions for the processor 1204. A storage device 1210, such as a magnetic disk or optical disk, is provided and coupled to the bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware, and/or program logic which in combination with computer system 1200 causes or programs computer system 1200 to be a special-purpose machine. In an embodiment, the techniques herein are performed by computer system 1200 in response to the processor 1204 executing one or more sequences of one or more instructions contained in the main memory 1206. Such instructions may be read into the main memory 1206 from another storage medium, such as the storage device 1210. Execution of the sequences of instructions contained in the main memory 1206 causes the processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 1210. Volatile media includes dynamic memory, such as the main memory 1206. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of bus 1202. Transmission media can also take the form of acoustic or light waves, such as those generated during radio wave and infrared data communications.

Various forms of media may be involved in carrying one or more sequences of one or more instructions to the processor 1204 for execution. For example, the instructions may initially be carried on a magnetic disk or solid-state drive of a remote computer. The remote computer can load the instructions into its dynamic memory and send the instructions over a telephone line or other communications medium, using a modem. A modem local to computer system 1200 can receive the data on the telephone line or other communications medium and use an infrared transmitter to convert the data to an infrared signal. An infrared detector can receive the data carried in the infrared signal and appropriate circuitry can place the data on the bus 1202. The bus 1202 carries the data to the main memory 1206, from which the processor 1204 retrieves and executes the instructions. The instructions received by the main memory 1206 may optionally be stored on the storage device 1210, either before or after execution by processor 1204.

Computer system 1200 also includes a communication interface 1218 coupled to the bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card configured to provide a data communication connection to a compatible LAN. Wireless links may also be implemented. In any such implementation, communication interface 1218 sends and receives electrical, electromagnetic, or optical signals that carry digital data streams representing various types of information.

Network link 1220 typically provides data communication through one or more networks to other data devices. For example, network link 1220 may provide a connection through a local network 1222 to a host computer 1224 or to data equipment operated by an Internet Service Provider (ISP) 1226. The ISP 1226 in turn provides data communication services through the world wide packet data communication network now commonly referred to as the "Internet" 1228. Local network 1222 and Internet 1228 both use electrical, electromagnetic, or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220, and communication interface 1218. In the Internet example, a server 1230 might transmit a requested code for an application program through the Internet 1228, ISP 1226, local network 1222, and communication interface 1218.

The received code may be executed by processor 1204 as it is received, and/or may be stored in the storage device 1210 or other non-volatile storage for later execution.

9. Miscellaneous; Extensions

Embodiments are directed to a system with one or more devices that include a hardware processor and that are configured to perform any of the operations described herein and/or recited in any of the claims below.

In an embodiment, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:
    encountering, by a mutator thread during a first garbage collection epoch, a first instruction to write a first value to a field;
    responsive to encountering the first instruction to write the first value to the field: entering a slow-path write barrier;
    performing, by the slow-path write barrier, a first one or more reference counting operations with respect to the field;
    encountering, by the mutator thread during the first garbage collection epoch and subsequent to encountering the first instruction to write the first value to the field, a second instruction to write a second value to the field;
    responsive to encountering the second instruction to write the second value to the field: entering a fast-path write barrier;
    wherein the fast-path write barrier does not perform any reference counting operations with respect to the field.

2. The one or more media of claim 1, wherein the first one or more first reference counting operations comprises:
    determining that a remembered set bit is not set for an address of the field;
    responsive to determining that the remembered set bit is not set for the address of the field: decrementing a reference count for an object previously referenced by the field.

3. The one or more media of claim 1, the operations further comprising:
    performing, by a garbage collection thread during a second garbage collection epoch, a second one or more reference counting operations with respect to the field.

4. The one or more media of claim 3, wherein the second one or more first reference counting operations comprises:
    determining that a remembered set bit is set for an address of the field;
    responsive to determining that the remembered set bit is set for the address of the field: incrementing a reference count for an object previously referenced by the field.

5. The one or more media of claim 1, the operations further comprising:
    clearing, by the slow-path write barrier, a remembered set bit corresponding to an address of the field.

6. The one or more media of claim 5, the operations further comprising:
performing, by a garbage collection thread during the first garbage collection epoch, remembered set scanning;
wherein the remembered set scanning refrains from scanning an entry corresponding to the remembered set bit cleared by the slow-path write barrier.

7. The one or more media of claim 1, the operations further comprising:
promoting an object assigned to the field from a first location in a first garbage collection generation to a second location in a second garbage collection generation;
before exposing the object in the second location to mutators, setting a remembered set bit associated with the second location;
wherein setting the remembered set bit associated with the second location prevents reference count decrements associated with the object until a subsequent young mark start.

8. A system comprising:
one or more hardware processors;
one or more non-transitory computer-readable media; and
program instructions stored on the one or more non-transitory computer readable media which, when executed by the one or more hardware processors, cause the system to perform operations comprising:
encountering, by a mutator thread during a first garbage collection epoch, a first instruction to write a first value to a field;
responsive to encountering the first instruction to write the first value to the field: entering a slow-path write barrier;
performing, by the slow-path write barrier, a first one or more reference counting operations with respect to the field;
encountering, by the mutator thread during the first garbage collection epoch and subsequent to encountering the first instruction to write the first value to the field, a second instruction to write a second value to the field;
responsive to encountering the second instruction to write the second value to the field: entering a fast-path write barrier;
wherein the fast-path write barrier does not perform any reference counting operations with respect to the field.

9. The system of claim 8, wherein the first one or more first reference counting operations comprises:
determining that a remembered set bit is not set for an address of the field;
responsive to determining that the remembered set bit is not set for the address of the field: decrementing a reference count for an object previously referenced by the field.

10. The system of claim 8, the operations further comprising:
performing, by a garbage collection thread during a second garbage collection epoch, a second one or more reference counting operations with respect to the field.

11. The system of claim 10, wherein the second one or more first reference counting operations comprises:
determining that a remembered set bit is set for an address of the field;
responsive to determining that the remembered set bit is set for the address of the field: incrementing a reference count for an object previously referenced by the field.

12. The system of claim 8, the operations further comprising:
clearing, by the slow-path write barrier, a remembered set bit corresponding to an address of the field.

13. The system of claim 12, the operations further comprising:
performing, by a garbage collection thread during the first garbage collection epoch, remembered set scanning;
wherein the remembered set scanning refrains from scanning an entry corresponding to the remembered set bit cleared by the slow-path write barrier.

14. The system of claim 8, the operations further comprising:
promoting an object assigned to the field from a first location in a first garbage collection generation to a second location in a second garbage collection generation;
after promoting the object and before exposing the object to mutators, setting a remembered set bit associated with the second location;
wherein setting the remembered set bit associated with the second location prevents reference count decrements associated with the object until a subsequent young mark start.

15. A method comprising:
encountering, by a mutator thread during a first garbage collection epoch, a first instruction to write a first value to a field;
responsive to encountering the first instruction to write the first value to the field: entering a slow-path write barrier;
performing, by the slow-path write barrier, a first one or more reference counting operations with respect to the field;
encountering, by the mutator thread during the first garbage collection epoch and subsequent to encountering the first instruction to write the first value to the field, a second instruction to write a second value to the field;
responsive to encountering the second instruction to write the second value to the field: entering a fast-path write barrier;
wherein the fast-path write barrier does not perform any reference counting operations with respect to the field;
wherein the method is performed by at least one device including a hardware processor.

16. The method of claim 15, wherein the first one or more first reference counting operations comprises:
determining that a remembered set bit is not set for an address of the field;
responsive to determining that the remembered set bit is not set for the address of the field: decrementing a reference count for an object previously referenced by the field.

17. The method of claim 15, further comprising:
performing, by a garbage collection thread during a second garbage collection epoch, a second one or more reference counting operations with respect to the field.

18. The method of claim 17, wherein the second one or more first reference counting operations comprises:
determining that a remembered set bit is set for an address of the field;
responsive to determining that the remembered set bit is set for the address of the field: incrementing a reference count for an object previously referenced by the field.

19. The method of claim 15, further comprising:
clearing, by the slow-path write barrier, a remembered set bit corresponding to an address of the field.

20. The method of claim 19, further comprising:
performing, by a garbage collection thread during the first garbage collection epoch, remembered set scanning;
wherein the remembered set scanning refrains from scanning an entry corresponding to the remembered set bit cleared by the slow-path write barrier.

* * * * *